US006859931B1

(12) United States Patent
Cheyer et al.

(10) Patent No.: US 6,859,931 B1
(45) Date of Patent: Feb. 22, 2005

(54) EXTENSIBLE SOFTWARE-BASED ARCHITECTURE FOR COMMUNICATION AND COOPERATION WITHIN AND BETWEEN COMMUNITIES OF DISTRIBUTED AGENTS AND DISTRIBUTED OBJECTS

(75) Inventors: Adam J. Cheyer, Palo Alto, CA (US); David L. Martin, Santa Clara, CA (US); Douglas B. Moran, Palo Alto, CA (US); William S. Mark, San Mateo, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/271,617

(22) Filed: Mar. 17, 1999

Related U.S. Application Data

(63) Continuation-in-part of application No. 09/225,198, filed on Jan. 5, 1999.

(51) Int. Cl.[7] ................................................. G06F 9/54
(52) U.S. Cl. ....................................... 719/317; 709/202
(58) Field of Search ........................ 719/317; 709/202, 709/317

(56) References Cited

U.S. PATENT DOCUMENTS

| | | | |
|---|---|---|---|
| 5,197,005 A | 3/1993 | Schwartz et al. | |
| 5,386,556 A | 1/1995 | Hedin et al. | |
| 5,434,777 A | 7/1995 | Luciw | |
| 5,519,608 A | 5/1996 | Kupiec | |
| 5,608,624 A | 3/1997 | Luciw | |
| 5,638,494 A | * 6/1997 | Pinard et al. | ................ 709/202 |
| 5,721,938 A | 2/1998 | Stuckey | |
| 5,729,659 A | 3/1998 | Potter | |
| 5,748,974 A | 5/1998 | Johnson | |
| 5,774,859 A | 6/1998 | Houser et al. | |
| 5,794,050 A | 8/1998 | Dahlgren et al. | |
| 5,802,526 A | 9/1998 | Fawcett et al. | |
| 5,805,775 A | 9/1998 | Eberman et al. | |
| 5,855,002 A | 12/1998 | Armstrong | |
| 5,890,123 A | 3/1999 | Brown et al. | |
| 5,944,783 A | * 8/1999 | Nieten | ........................ 709/202 |
| 5,960,404 A | * 9/1999 | Chaar et al. | ................... 705/11 |
| 5,963,940 A | 10/1999 | Liddy et al. | |
| 6,003,072 A | 12/1999 | Gerritsen et al. | |
| 6,012,030 A | 1/2000 | French-St. George et al. | |
| 6,021,427 A | 2/2000 | Spagna et al. | |
| 6,026,388 A | 2/2000 | Liddy et al. | |
| 6,049,819 A | * 4/2000 | Buckle et al. | ............... 709/202 |
| 6,080,202 A | 6/2000 | Strickland et al. | |

(List continued on next page.)

FOREIGN PATENT DOCUMENTS

| | | |
|---|---|---|
| EP | 0 803 826 A2 | 10/1997 |
| WO | WO 00/11869 | 3/2000 |

OTHER PUBLICATIONS

Bayardo, R.J. et al. "InfoSleuth: Agent–Based Semantic Integration of Information in Open and Dynamic Environments." ACM. 1997.*

(List continued on next page.)

Primary Examiner—Lewis A. Bullock, Jr.
(74) Attorney, Agent, or Firm—Perkins Coie LLP

(57) ABSTRACT

A distributed agent community is able to dynamically interact with alternative sofware technologies that manage distributed objects. The leveraging of capabilities of distributed object systems greatly expands the flexibility and capabilites of the distributed agent community. Through access to distributed object systems, the distributed agent community can draw on the capabilites of all the objects managed by the distributed object systems. The access to distributed systems by the distributed agent community allows for collaboration and intelligent planning that the distributed object systems do not themsleves provide.

24 Claims, 17 Drawing Sheets

U.S. PATENT DOCUMENTS

| | | | |
|---|---|---|---|
| 6,144,989 A | 11/2000 | Hodjat et al. | |
| 6,173,279 B1 | 1/2001 | Levin et al. | |
| 6,192,338 B1 | 2/2001 | Haszto et al. | |
| 6,216,173 B1 * | 4/2001 | Jones et al. | 345/705 |
| 6,226,666 B1 * | 5/2001 | Chang et al. | 709/202 |
| 6,338,081 B1 | 1/2002 | Furusawa et al. | |
| 6,510,429 B1 * | 1/2003 | Todd | 707/10 |
| 6,574,655 B1 * | 6/2003 | Libert et al. | 709/200 |
| 2001/0013051 A1 * | 8/2001 | Nakada et al. | 709/202 |
| 2002/0019818 A1 * | 2/2002 | Masuoka et al. | 707/3 |

OTHER PUBLICATIONS

Genesereth, Michael et al. "Infomaster: An Information Integration System." ACM. 1997.*

Cheyer, Adam. "Mechanisms of Cooperation." Oct. 19, 1998.*

DeVoe, Deborah. "SRI distributed agents promise flexibility." InfoWorld. Dec. 30, 1996.*

Sycara, Katia et al. "Distributed Intelligent Agents." IEEE. Dec. 1996.*

Moran, Douglas B. and Cheyer, Adam J., "Intelligent Agent– based User Interfaces", Article Intelligence center, SRI International.

Martin, David L., Cheyer, Adam J. and Moran, Douglas B., "Building Distributed Software Systems with the Open Agent Architecture".

Cohen, Philip R. and Cheyer, Adam, SRI International, Wang, Michelle, Stanford University, BAEG, Soon Cheol, ETRI, "An Open Agent Architecture", AAAI Spring Symposium, pp 1–8, Mar. 1994.

Julia, Luc E. and Cheyer, Adam J., SRI International "Cooperative Agents and Recognition Systems (CARS) for Drivers and Passengers".

Moran, Douglas B., Cheyer, Adam J., Julia, Luc E., Martin, David L., SRI International, and Park, Sangkyu, Electronics and Telecommunications Research Institute, "Multimodal User Interfaces in the Open Agent Architecture".

Cheyer, Adam and Lulia, Luc, SRI International "Multimodal Maps: An Agent–based Approach".

Cutkosky, Mark R., Engelmore, Robert S., Fikes, Richard E., Genesereth, Michael R., Gruber, Thomas R., Stanford University, Mark, William, Lockheed Palo Alto Research Labs, Tenenbaum, Jay M., Weber, Jay C., Enterprise Integration Technologies, "An Experiment in Integrating Concurrent Engineering Systems".

Martin, David L., Cheyer, Adam, SRI International, Lee, Gowang–Lo, ETRI, "Development Tools for the Open Agent Architecture", The Practical Application of Intelligent Agents and Multi–Agent Technology (PAAM96), London, Apr. 1996.

Cheyer, Adam, Martin, David and Moran, Douglas, "The Open Agent architecture™", SRI International, AI Center.

Dejima, Inc., http://www.dejima.com/.

Martin, David; Oohama, Hiroki; Moran, Douglas; Cheyer, Adam; "Information Brokering in an Agent Architecture," Proceeding of the $2^{nd}$ International Conference on Practical Application of Intelligent Agents & Multi–Agent Technology, London, Apr. 1997.

Dowding, John et al., "Gemini: A Natural Language System For Spoken–Language Understanding", SRI International.

http://www.ai.sri.com/~oaa/infowiz.html, InfoWiz: An Animated Voice Interactive Information System, May 8, 2000.

Dowding, John, "Interleaving Syntax and Semantics in an Efficient Bottom–up Parser", SRI International.

Moore, Robert et al., "Combining Linguistic and Statistical Knowledge Sources in a Natural–Language Processing for ATIS", SRI International.

Stent, Amanda et al., "The CommandTalk Spoken Dialog System", SRI International.

Moore, Robert et al., CommandTalk: A Spoken–Language Interface for Battlefield Simulations:, Oct. 23, 1997, SRI International.

Dowding, John et al., "Interpreting Language in Context in CommandTalk", Feb. 5, 1999, SRI International.

Moran, Douglas B. et al., "Intelligent Agent–based User Interfaces", Article Intelligence center, SRI International.

Martin, David L. et al., "Building Distributes Software Systems with the Open Agent Architecture".

Julia, Luc. et al., "Cooperative Agents and Recognition System (CARS) for Drivers and Passengers", SRI International.

Moran, Douglas et al., "Multimodal User Interfaces in the Open Agent Architecture".

Cheyer, Adam et al., "Multimodal Maps: An Agent–based Approach", SRI International.

Cutkosky, Mark R. et al., "An Experiment in Integrating Concurrent Engineering Systems".

Martin, David et al., "Development Tools for the Open Agent Architecture", The Practical Application of Intelleigent Agents and Multi–Agent Technology (PAAM96), London, Apr. 1996.

Cheyer, Adam et al.,"The Open Agent Architecture™", SRI International, AI center.

Dejima, Inc., http://www.dejima.com/.

Cohen, Philip et al., "An Open Agent Architecture", AAAI Spring Symposium, pp 1–8, Mar. 1994.

Martin, David et al., "Information Brokering in an Agent Architecture", Proceeding of the $2^{nd}$ Int'l Conference on Practical Application of Intelligent Agents & Multi–Agent Technology, London, Apr. 1997.

* cited by examiner

EXTENSIBLE SOFTWARE-BASED ARCHITECTURE FOR COMMUNICATION AND COOPERATION WITHIN AND BETWEEN COMMUNITIES OF DISTRIBUTED AGENTS AND DISTRIBUTED OBJECTS

CROSS-REFERENCE TO RELATED APPLICATIONS

This is a Continuation In Part of co-pending U.S. patent application Ser. No. 09/225,198, filed Jan. 5, 1999, which co-pending application is incorporated herein by reference in its entirety.

BACKGROUND OF THE INVENTION

Field of the Invention

The present invention is related to distributed computing environments and the completion of tasks within such environments. In particular, the present invention teaches a variety of software-based architectures for communication and cooperation among distributed electronic agents. Certain embodiments teach interagent communication languages enabling client agents to make requests in the form of arbitrarily complex goal expressions that are solved through facilitation by a facilitator agent.

Context and Motivation for Distributed Software Systems

The evolution of models for the design and construction of distributed software systems is being driven forward by several closely interrelated trends: the adoption of a networked computing model, rapidly rising expectations for smarter, longer-lived more autonomous software applications and an ever increasing demand for more accessible and intuitive user interfaces.

Prior Art FIG. 1 illustrates a networked computing model 100 having a plurality of client and server computer systems 120 and 122 coupled together over a physical transport mechanism 140. The adoption of the networked computing model 100 has lead to a greatly increased reliance on distributed sites for both data and processing resources. Systems such as the networked computing model 100 are based upon at least one physical transport mechanism 140 coupling the multiple computer systems 120 and 122 to support the transfer of information between these computers. Some of these computers basically support using the network and are known as client computers (clients). Some of these computers provide resources to other computers and are known as server computers (servers). The servers 122 can vary greatly in the resources they possess, access they provide and services made available to other computers across a network. Servers may service other servers as well as clients.

The Internet is a computing system based upon this network computing model. The Internet is continually growing, stimulating a paradigm shift for computing away from requiring all relevant data and programs to reside on the user's desktop machine. The data now routinely accessed from computers spread around the world has become increasingly rich in format, comprising multimedia documents, and audio and video streams. With the popularization of programming languages such as JAVA, data transported between local and remote machines may also include programs that can be downloaded and executed on the local machine. There is an ever increasing reliance on networked computing, necessitating software design approaches that allow for flexible composition of distributed processing elements in a dynamically changing and relatively unstable environment.

In an increasing variety of domains, application designers and users are coming to expect the deployment of smarter, longer-lived, more autonomous, software applications. Push technology, persistent monitoring of information sources, and the maintenance of user models, allowing for personalized responses and sharing of preferences, are examples of the simplest manifestations of this trend. Commercial enterprises are introducing significantly more advanced approaches, in many cases employing recent research results from artificial intelligence, data mining, machine learning, and other fields.

More than ever before, the increasing complexity of systems, the development of new technologies, and the availability of multimedia material and environments are creating a demand for more accessible and intuitive user interfaces. Autonomous, distributed, multi-component systems providing sophisticated services will no longer lend themselves to the familiar "direct manipulation" model of interaction, in which an individual user masters a fixed selection of commands provided by a single application. Ubiquitous computing, in networked environments, has brought about a situation in which the typical user of many software services is likely to be a non-expert, who may access a given service infrequently or only a few times. Accommodating such usage patterns calls for new approaches. Fortunately, input modalities now becoming widely available, such as speech recognition and pen-based handwriting/gesture recognition, and the ability to manage the presentation of systems' responses by using multiple media provide an opportunity to fashion a style of human-computer interaction that draws much more heavily on our experience with human-human interactions.

PRIOR RELATED ART

Existing approaches and technologies for distributed computing include distributed objects, mobile objects, blackboard-style architectures, and agent-based software engineering.

The Distributed Object Approach

Object-oriented languages, such as C++ or JAVA, provide significant advances over standard procedural languages with respect to the reusability and modularity of code: encapsulation, inheritance and polymorhpism. Encapsulation encourages the creation of library interfaces that minimize dependencies on underlying algorithms or data structures. Changes to programming internals can be made at a later date with requiring modifications to the code that uses the library. Inheritance permits the extension and modification of a library of routines and data without requiring source code to the original library. Polymorphism allows one body of code to work on an arbitrary number of data types. For the sake of simplicity traditional objects may be seen to contain both methods and data. Methods provide the mechanisms by which the internal state of an object may be modified or by which communication may occur with another object or by which the instantiation or removal of objects may be directed.

With reference to FIG. 2, a distributed object technology based around an Object Request Broker will now be described. Whereas "standard" object-oriented programming (OOP) languages can be used to build monolithic programs out of many object building blocks, distributed object technologies (DOOP) allow the creation of programs whose components may be spread across multiple machines. As shown in FIG. 2, an object system 200 includes client objects 210 and server objects 220. To implement a client-server relationship between objects, the distributed object system 200 uses a registry mechanism (CORBA's registry is called an Object Request Broker, or ORB) 230 to store the interface descriptions of available objects. Through the services of the ORB 230, a client can transparently invoke a method on a remote server object. The ORB 230 is then responsible for finding the object 220 that can implement the request, passing it the parameters, invoking its method, and returning the results. In the most sophisticated systems, the client 210 does not have to be aware of where the object is located, its programming language, its operating system, or any other system aspects that are not part of the server object's interface.

Although distributed objects offer a powerful paradigm for creating networked applications, certain aspects of the approach are not perfectly tailored to the constantly changing environment of the Internet. A major restriction of the DOOP approach is that the interactions among objects are fixed through explicitly coded instructions by the application developer. It is often difficult to reuse an object in a new application without bringing along all its inherent dependencies on other objects (embedded interface definitions and explicit method calls). Another restriction of the DOOP approach is the result of its reliance on a remote procedure call (RPC) style of communication. Although easy to debug, this single thread of execution model does not facilitate programming to exploit the potential for parallel computation that one would expect in a distributed environment. In addition, RPC uses a blocking (synchronous) scheme that does not scale well for high-volume transactions.

Mobile Objects

Mobile objects, sometimes called mobile agents, are bits of code that can move to another execution site (presumably on a different machine) under their own programmatic control, where they can then interact with the local environment. For certain types of problems, the mobile object paradigm offers advantages over more traditional distributed object approaches. These advantages include network bandwidth and parallelism. Network bandwidth advantages exist for some database queries or electronic commerce applications, where it is more efficient to perform tests on data by bringing the tests to the data than by bringing large amounts of data to the testing program. Parallelism advantages include situations in which mobile agents can be spawned in parallel to accomplish many tasks at once.

Some of the disadvantages and inconveniences of the mobile agent approach include the programmatic specificity of the agent interactions, lack of coordination support between participant agents and execution environment irregularities regarding specific programming languages supported by host processors upon which agents reside. In a fashion similar to that of DOOP programming, an agent developer must programmatically specify where to go and how to interact with the target environment. There is generally little coordination support to encourage interactions among multiple (mobile) participants. Agents must be written in the programming language supported by the execution environment, whereas many other distributed technologies support heterogeneous communities of components, written in diverse programming languages.

Blackboard Architectures

Blackboard architectures typically allow multiple processes to communicate by reading and writing tuples from a global data store. Each process can watch for items of interest, perform computations based on the state of the blackboard, and then add partial results or queries that other processes can consider. Blackboard architectures provide a flexible framework for problem solving by a dynamic community of distributed processes. A blackboard architecture provides one solution to eliminating the tightly bound interaction links that some of the other distributed technologies require during interprocess communication. This advantage can also be a disadvantage: although a programmer does not need to refer to a specific process during computation, the framework does not provide programmatic control for doing so in cases where this would be practical.

Agent-Based Software Engineering

Several research communities have approached distributed computing by casting it as a problem of modeling communication and cooperation among autonomous entities, or agents. Effective communication among independent agents requires four components: (1) a transport mechanism carrying messages in an asynchronous fashion, (2) an interaction protocol defining various types of communication interchange and their social implications (for instance, a response is expected of a question), (3) a content language permitting the expression and interpretation of utterances, and (4) an agreed-upon set of shared vocabulary and meaning for concepts (often called an ontology). Such mechanisms permit a much richer style of interaction among participants than can be expressed using a distributed object's RPC model or a blackboard architecture's centralized exchange approach.

Agent-based systems have shown much promise for flexible, fault-tolerant, distributed problem solving. Several agent-based projects have helped to evolve the notion of facilitation. However, existing agent-based technologies and architectures are typically very limited in the extent to which agents can specify complex goals or influence the strategies used by the facilitator. Further, such prior systems are not sufficiently attuned to the importance of integrating human agents (i.e., users) through natural language and other human-oriented user interface technologies.

The initial version of SRI International's Open Agent Architecture™ ("OAA®") technology provided only a very limited mechanism for dealing with compound goals. Fixed formats were available for specifying a flat list of either conjoined (AND) sub-goals or disjoined (OR) sub-goals; in both cases, parallel goal solving was hard-wired in, and only a single set of parameters for the entire list could be specified. More complex goal expressions involving (for example) combinations of different boolean connectors, nested expressions, or conditionally interdependent ("IF . . . THEN") goals were not supported. Further, system scalability was not adequately addressed in this prior work.

SUMMARY OF INVENTION

A first embodiment of the present invention discloses a highly flexible, software-based architecture for constructing distributed systems. The architecture supports cooperative task completion by flexible, dynamic configurations of autonomous electronic agents. Communication and cooperation between agents are brokered by one or more facilitators, which are responsible for matching requests, from users and agents, with descriptions of the capabilities of other agents. It is not generally required that a user or agent know the identities, locations, or number of other agents involved in satisfying a request, and relatively minimal effort is involved in incorporating new agents and "wrapping" legacy applications. Extreme flexibility is achieved through an architecture organized around the declaration of capabilities by service-providing agents, the construction of arbitrarily complex goals by users and service-requesting agents, and the role of facilitators in delegating and coordinating the satisfaction of these goals, subject to advice and constraints that may accompany them. Additional mechanisms and features include facilities for creating and maintaining shared repositories of data; the use of triggers to instantiate commitments within and between agents; agent-based provision of multi-modal user interfaces, including natural language; and built-in support for including the user as a privileged member of the agent community. Specific embodiments providing enhanced scalability are also described.

Other embodiments of the invention draw upon a community of components registered in a multiple component registry in order to increase the resources available the to solve a service request. Such multiple component registries include distributed object services based on software such as Jini, or Corba, and include registries of software based objects which can be invoked to accomplish a given task.

BRIEF DESCRIPTION OF THE DRAWINGS

Prior Art

Prior Art

Prior Art

Examples of the Invention

Figure 3:
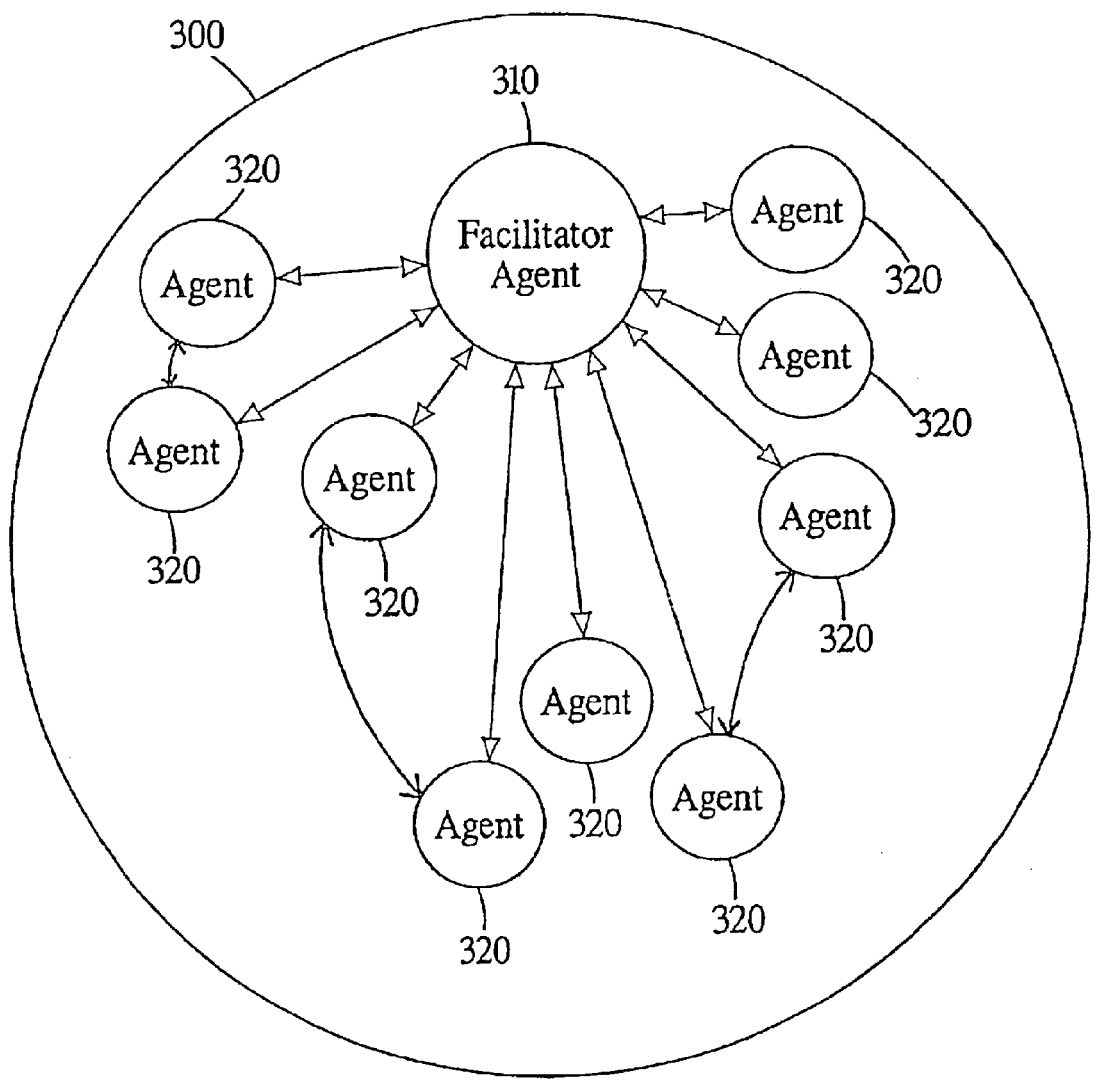
Figure 4:
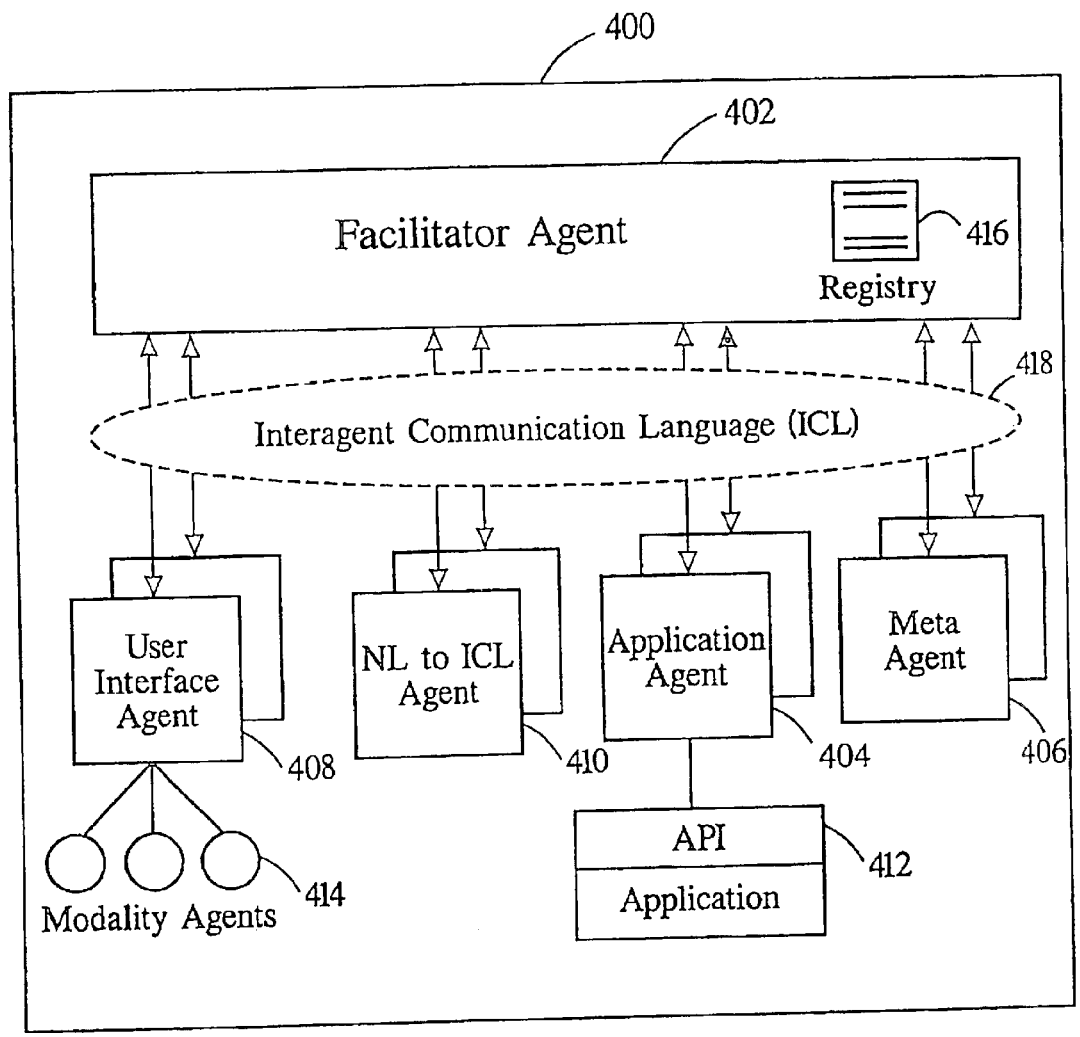
Figure 5:
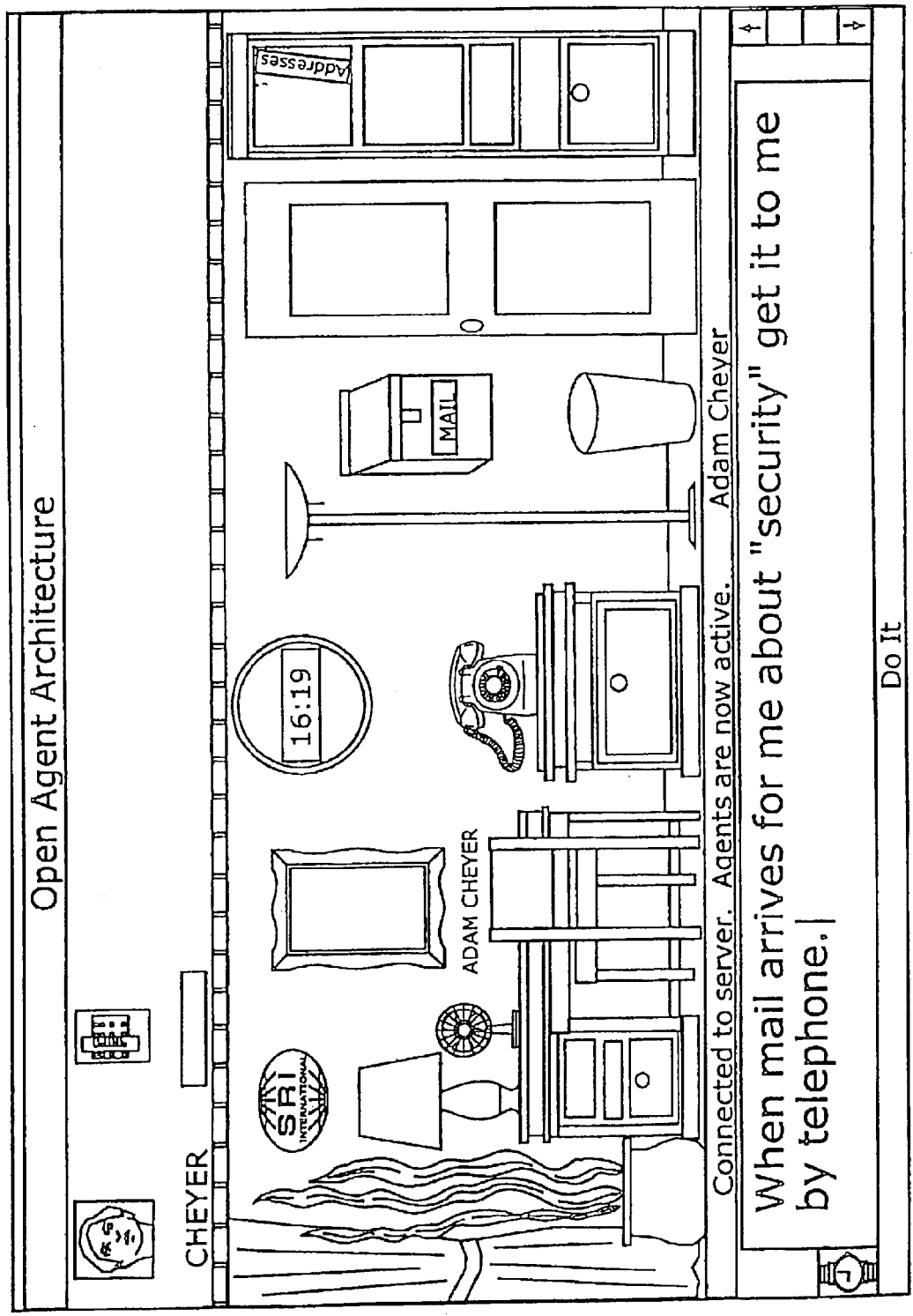
Figure 6:
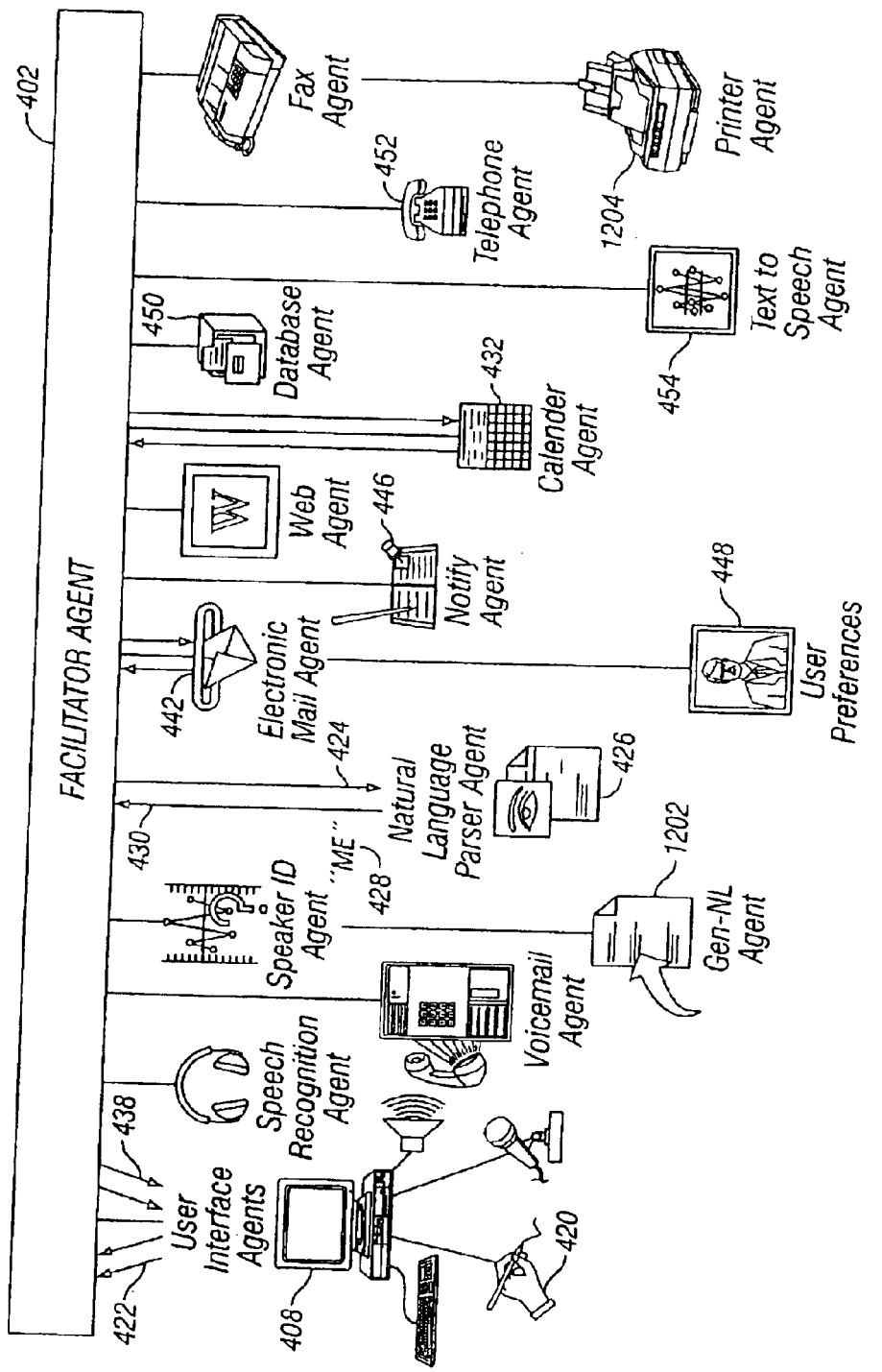
Figure 7:
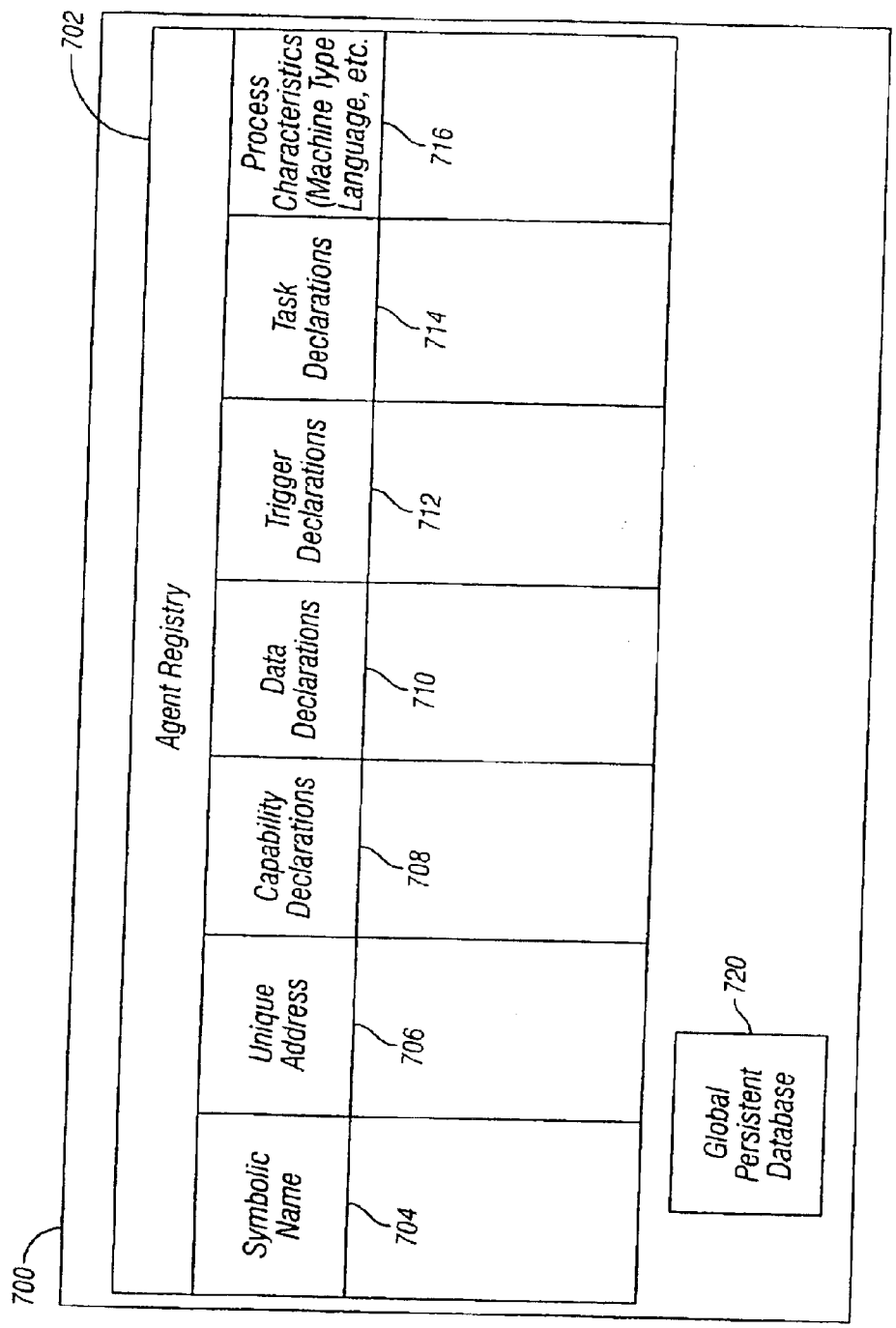
Figure 8:
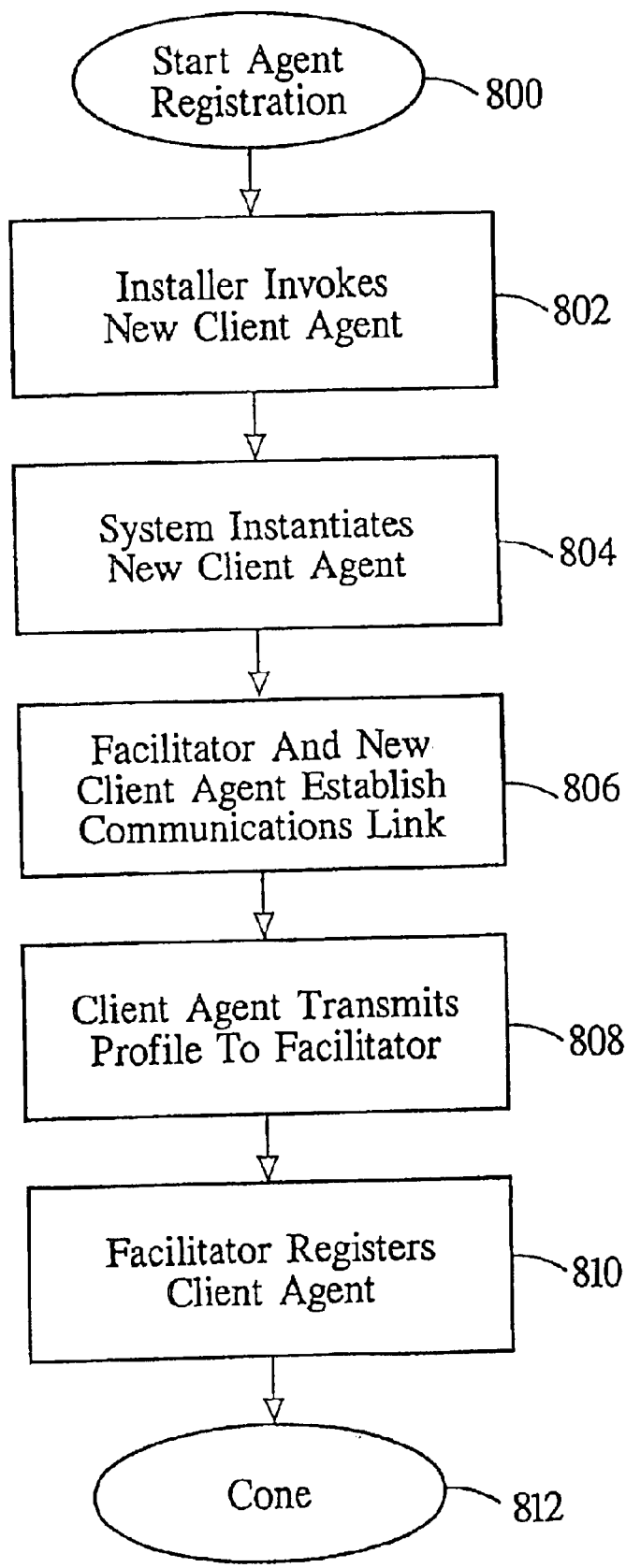
Figure 9:
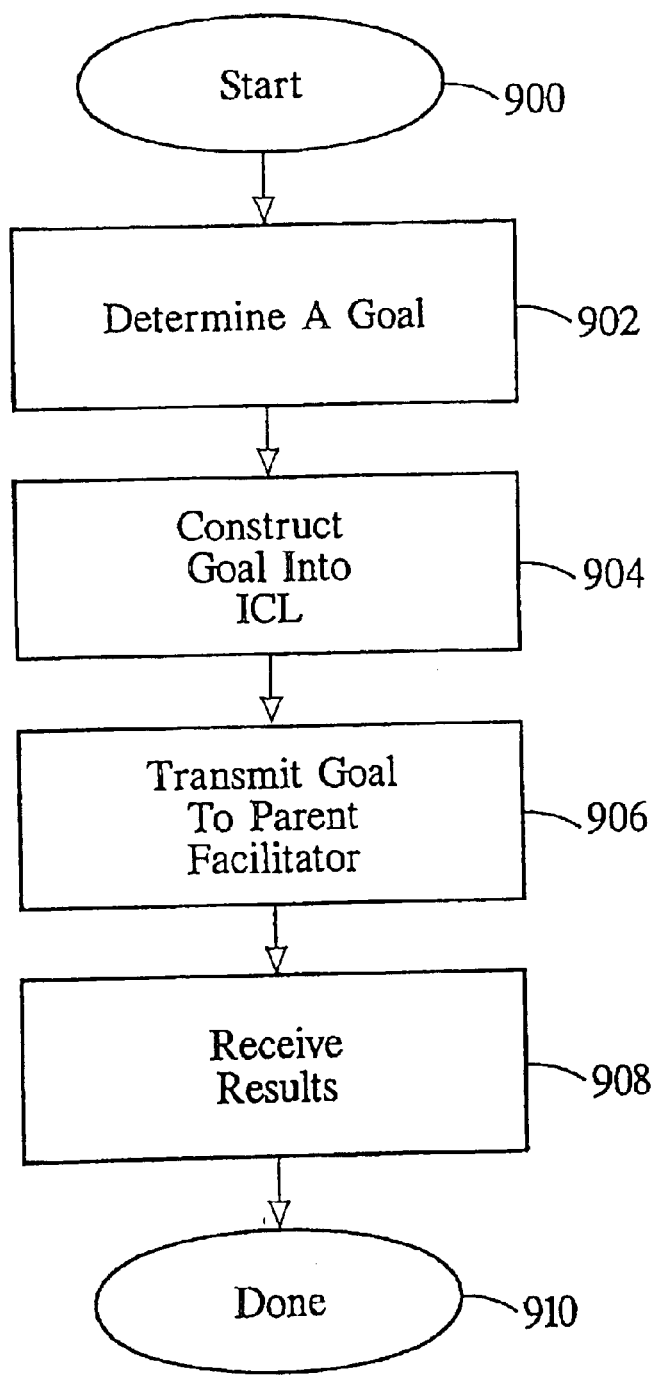
Figure 10:
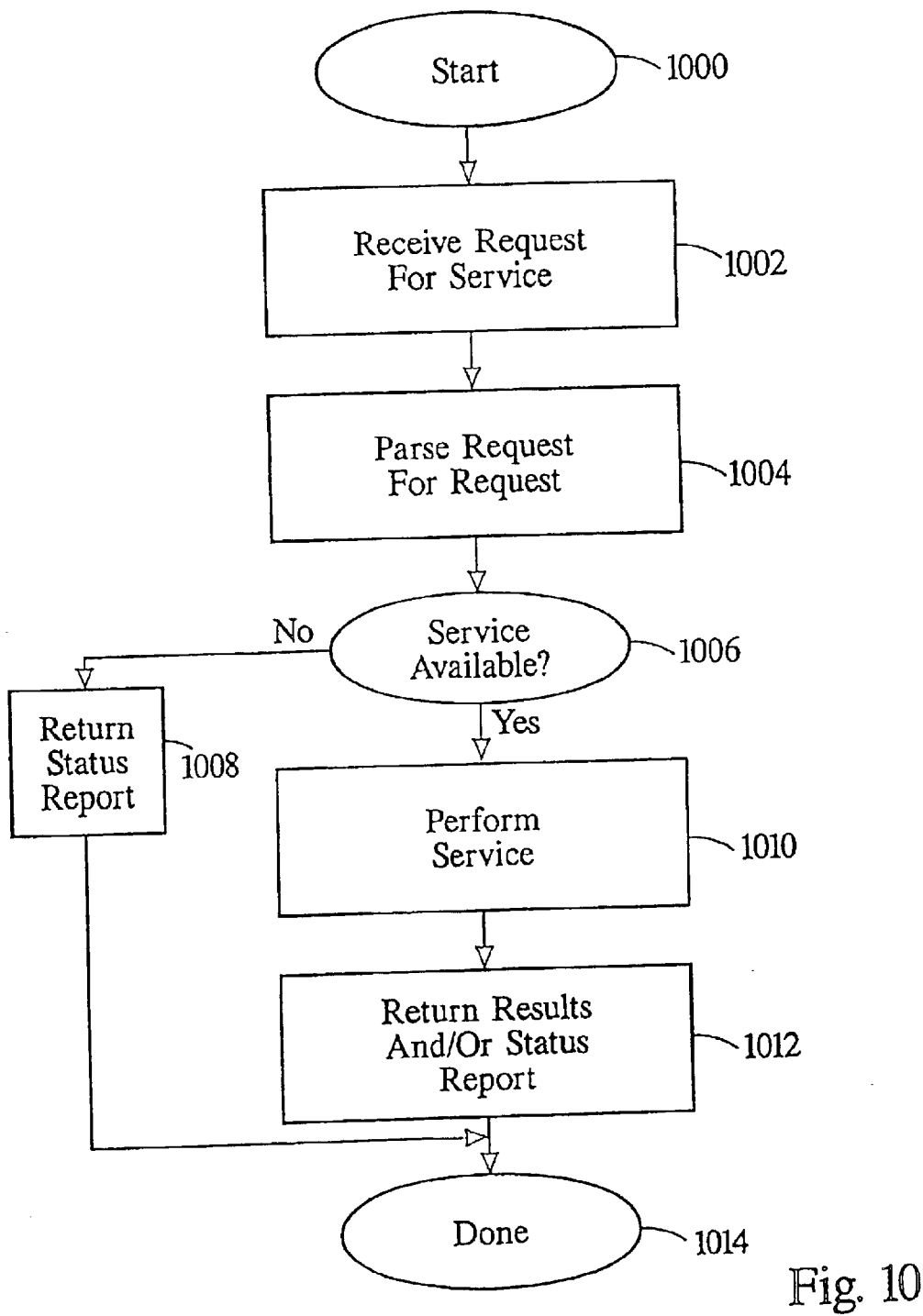
Figure 11:
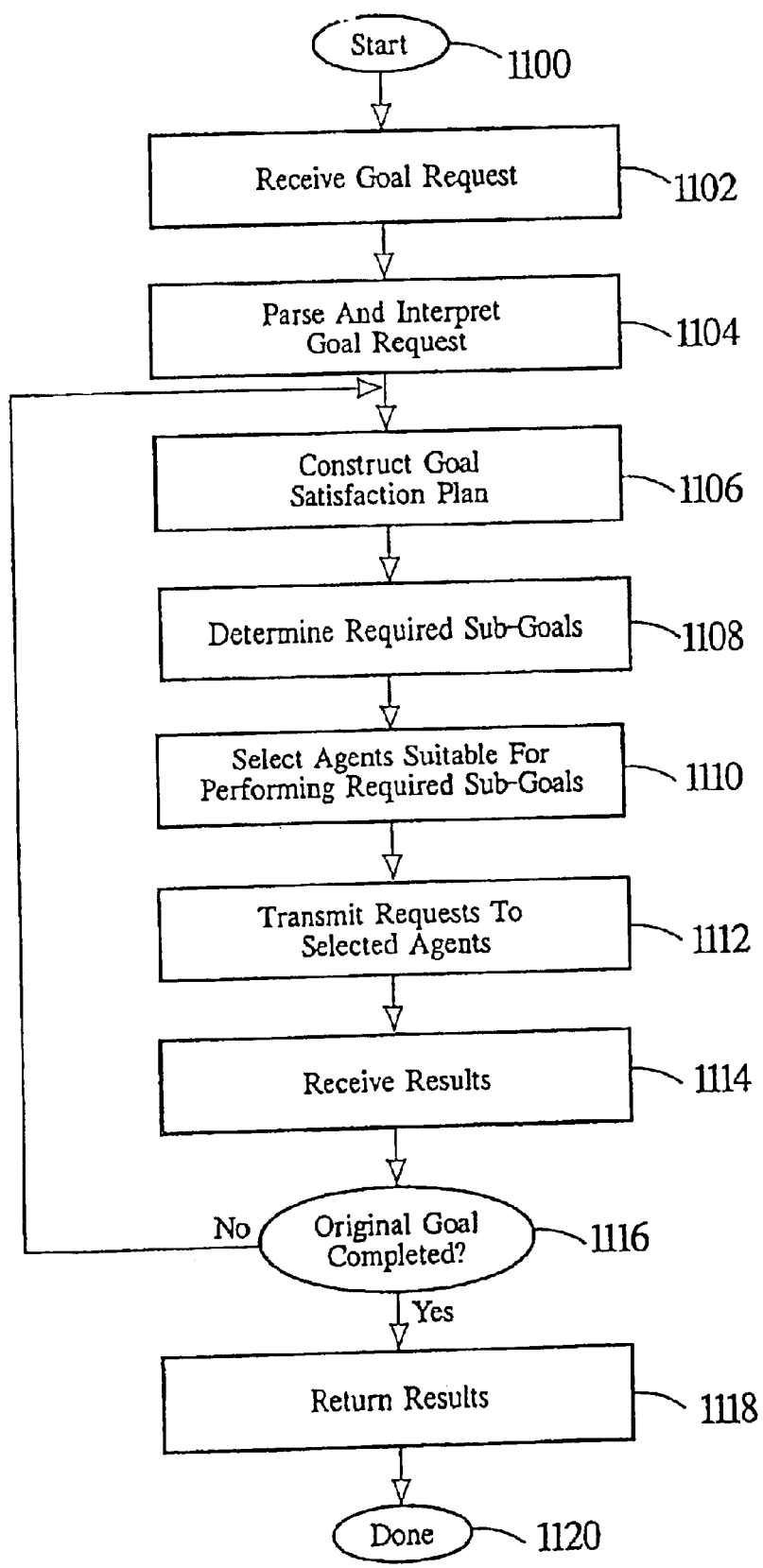
Figure 12:
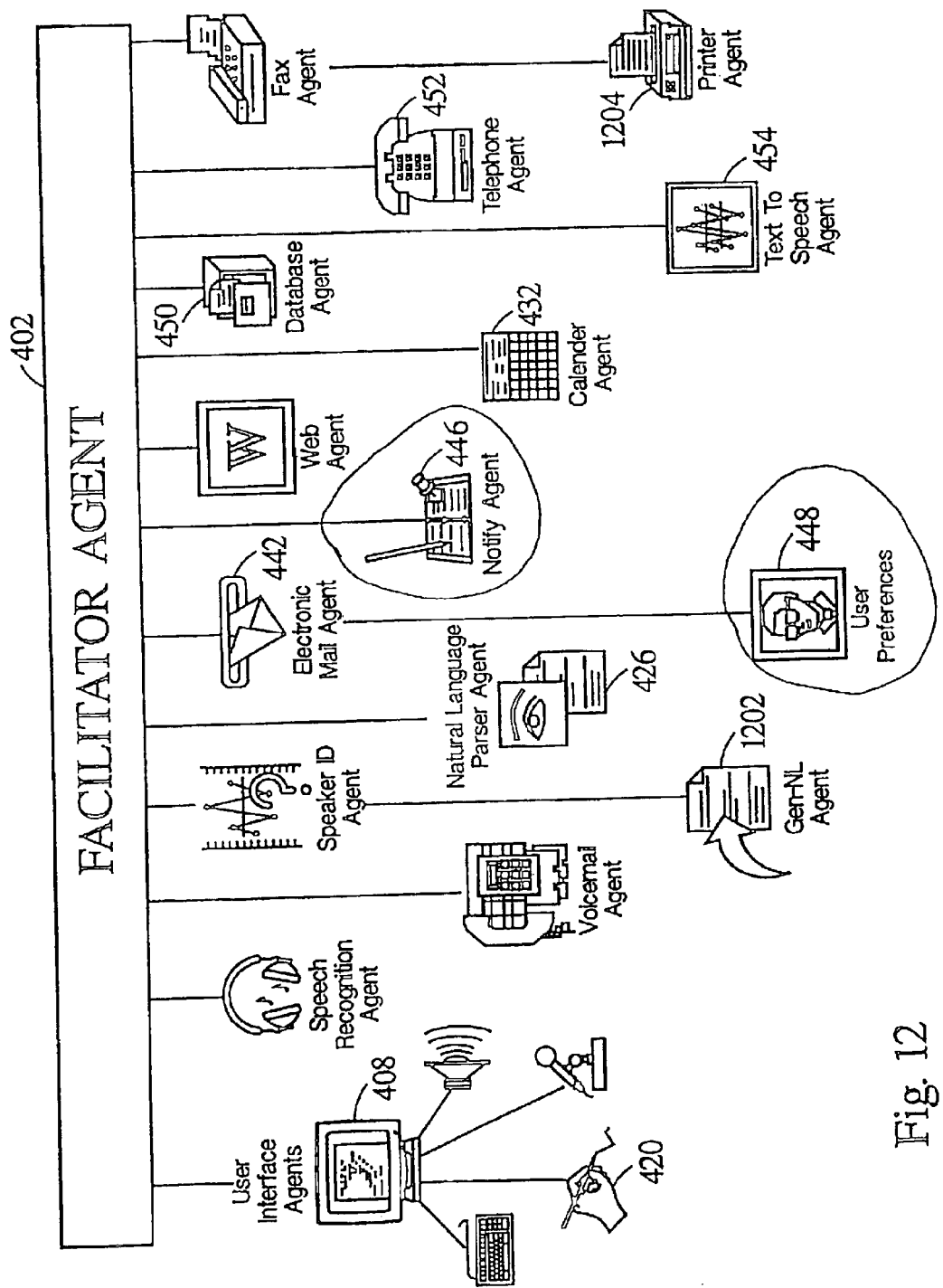
Figure 13:
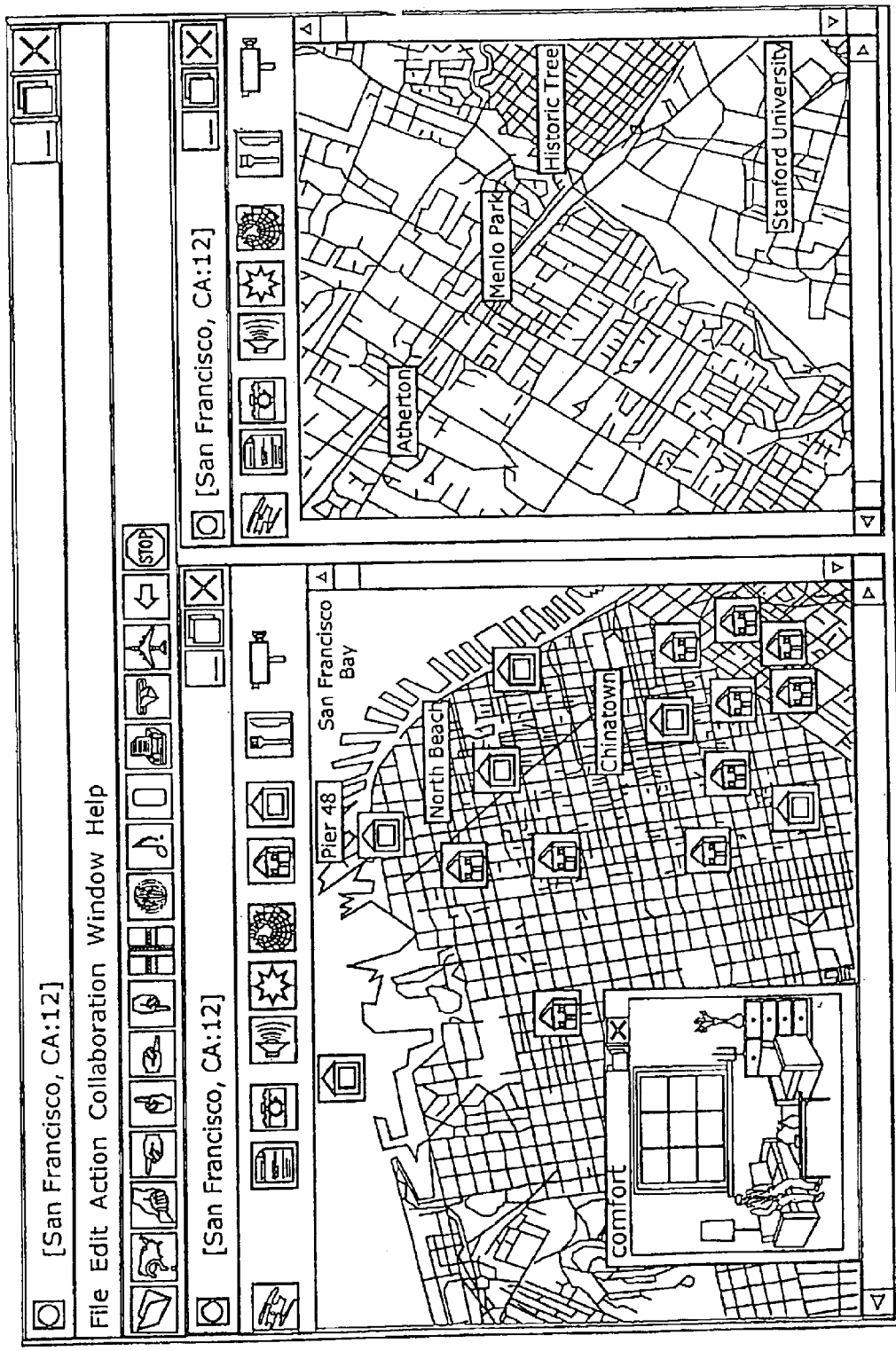
Figure 14:
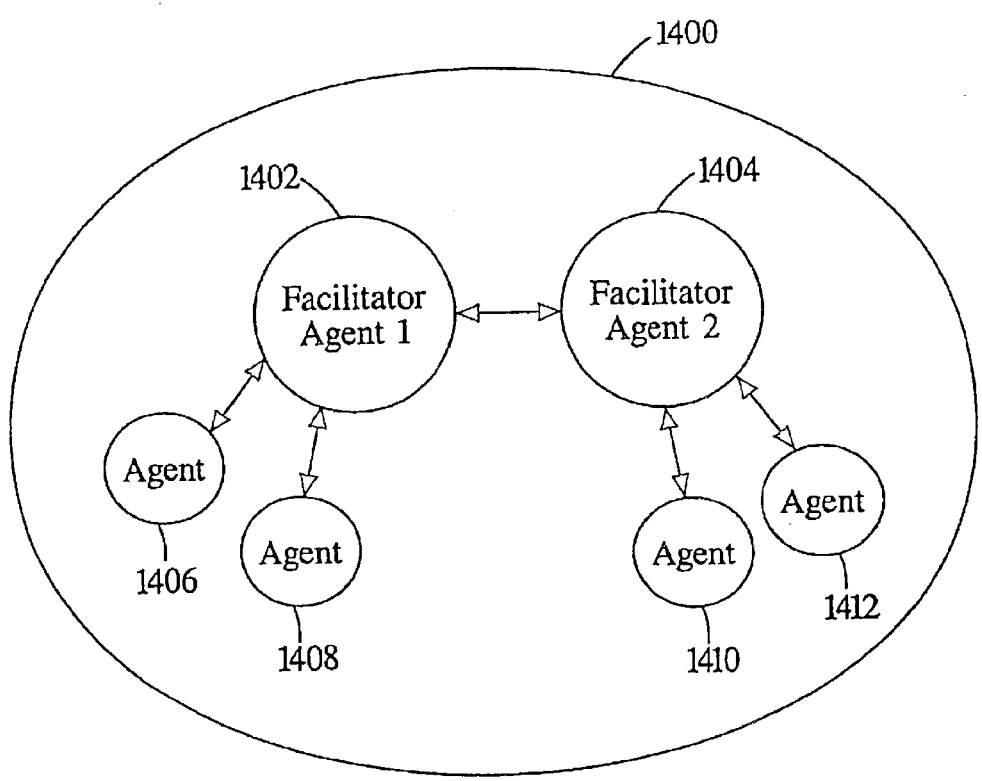
Figure 15:
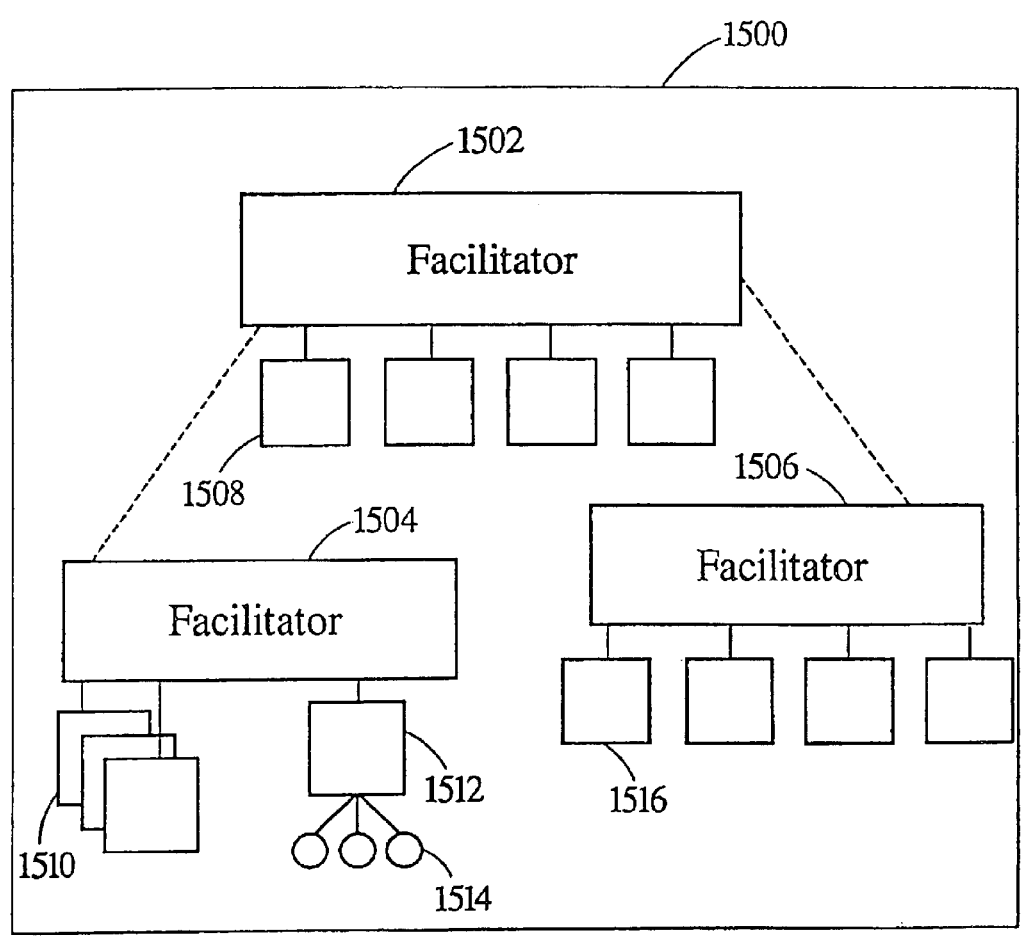
Figure 16:
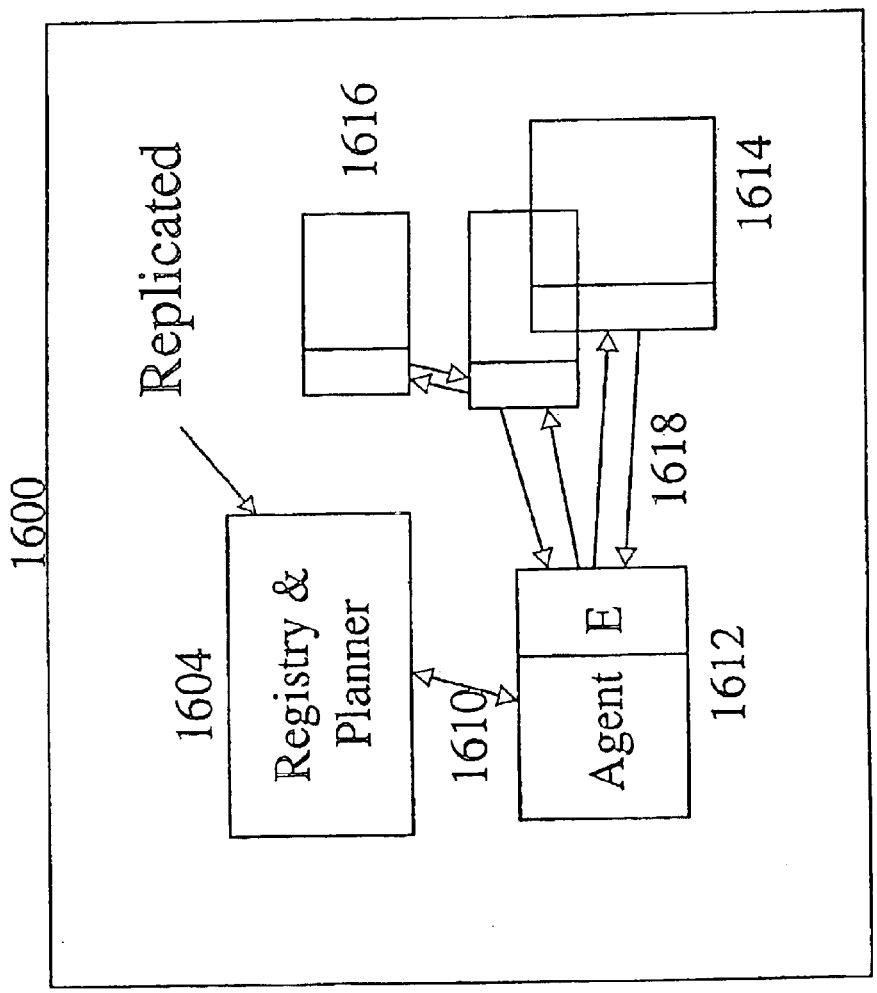

FIG. 3 depicts a distributed agent system based around a facilitator agent;

FIG. 4 presents a structure typical of one small system of the present invention;

FIG. 5 depicts an Automated Office system implemented in accordance with an example embodiment of the present invention supporting a mobile user with a laptop computer and a telephone;

FIG. 6 schematically depicts an Automated Office system implemented as a network of agents in accordance with a preferred embodiment of the present invention;

FIG. 7 schematically shows data structures internal to a facilitator in accordance with a preferred embodiment of the present invention;

FIG. 8 depicts operations involved in instantiating a client agent with its parent facilitator in accordance with a preferred embodiment of the present invention;

FIG. 9 depicts operations involved in a client agent initiating a service request and receiving the response to that service request in accordance with a certain preferred embodiment of the present invention;

FIG. 10 depicts operations involved in a client agent responding to a service request in accordance with another preferable embodiment of the present invention;

FIG. 11 depicts operations involved in a facilitator agent response to a service request in accordance with a preferred embodiment of the present invention;

FIG. 12 depicts an Open Agent Architecture™ based system of agents implementing a unified messaging application in accordance with a preferred embodiment of the present invention;

FIG. 13 depicts a map oriented graphical user interface display as might be displayed by a multi-modal map application in accordance with a preferred embodiment of the present invention;

FIG. 14 depicts a peer to peer multiple facilitator based agent system supporting distributed agents in accordance with a preferred embodiment of the present invention;

FIG. 15 depicts a multiple facilitator agent system supporting at least a limited form of a hierarchy of facilitators in accordance with a preferred embodiment of the present invention; and FIG. 16 depicts a replicated facilitator architecture in accordance with one embodiment of the present invention.

Figure 17:
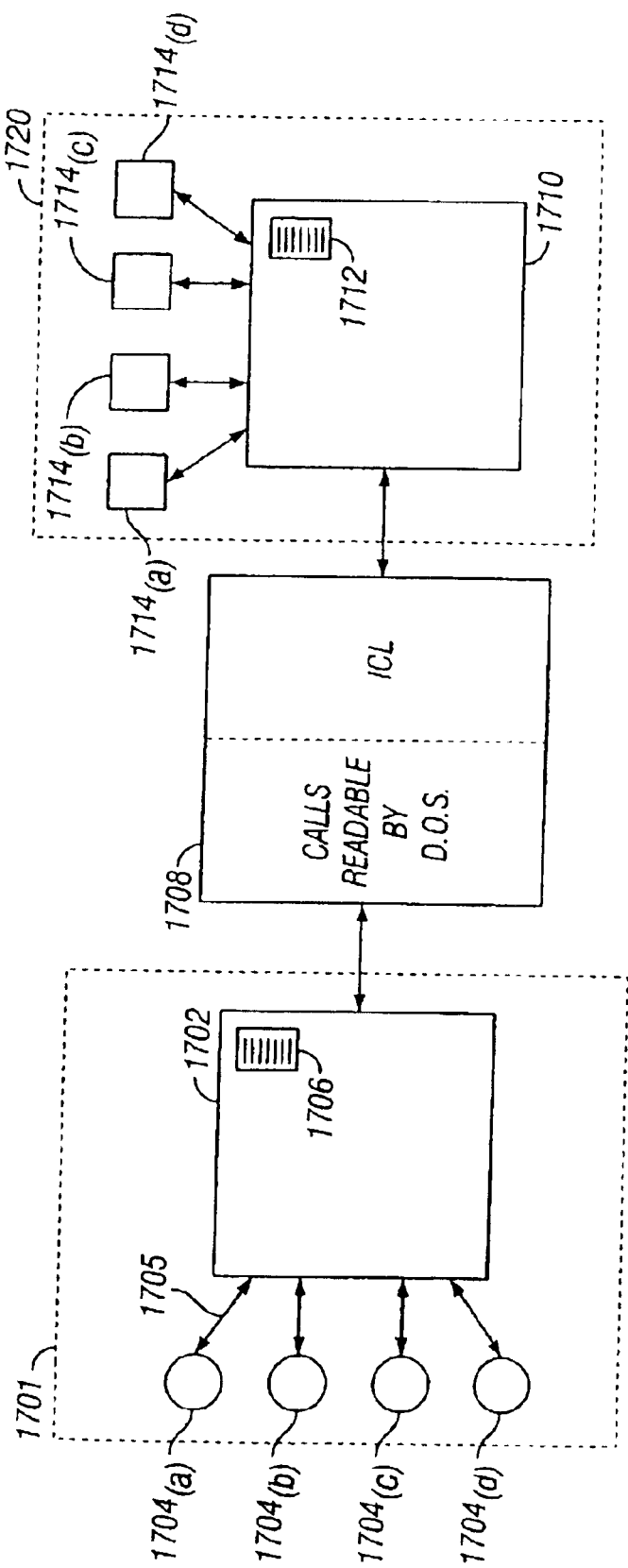

FIG. 17 depicts a facilitator architecture used in conjunction with a multiple component registry through the use of a bridge agent.

DETAILED DESCRIPTION OF THE INVENTION

FIG. 3 illustrates a distributed agent system 300 in accordance with one embodiment of the present invention. The agent system 300 includes a facilitator agent 310 and a plurality of agents 320. The illustration of FIG. 3 provides a high level view of one simple system structure contemplated by the present invention. The facilitator agent 310 is in essence the "parent" facilitator for its "children" agents 320. The agents 320 forward service requests to the facilitator agent 310. The facilitator agent 310 interprets these requests, organizing a set of goals which are then delegated to appropriate agents for task completion.

Figure 1:
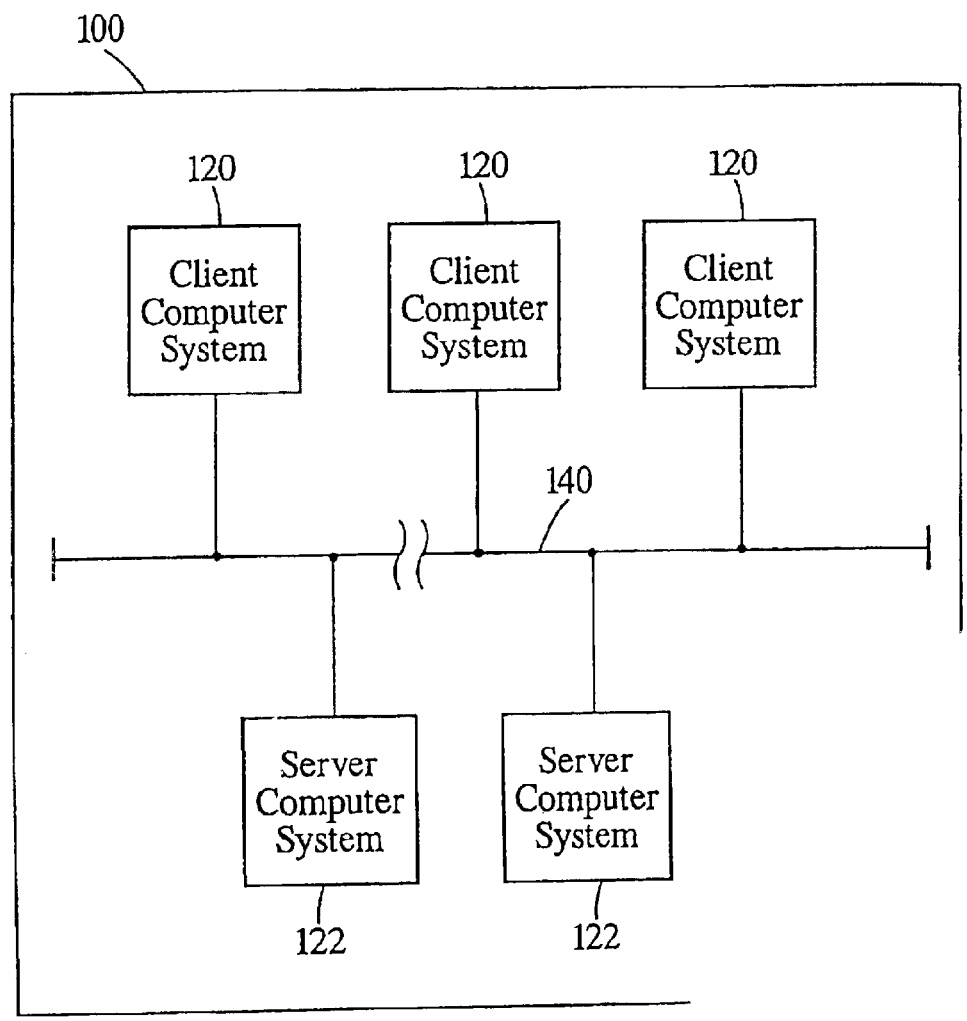
FIG. 1 depicts a networked computing model.

The system 300 of FIG. 3 can be expanded upon and modified in a variety of ways consistent with the present invention. For example, the agent system 300 can be distributed across a computer network such as that illustrated in FIG. 1. The facilitator agent 310 may itself have its functionality distributed across several different computing platforms. The agents 320 may engage in interagent communication (also called peer to peer communications). Several different systems 300 may be coupled together for enhanced performance. These and a variety of other structural configurations are described below in greater detail.

FIG. 4 presents the structure typical of a small system 400 in one embodiment of the present invention, showing user interface agents 408, several application agents 404 and meta-agents 406, the system 400 organized as a community of peers by their common relationship to a facilitator agent 402. As will be appreciated, FIG. 4 places more structure upon the system 400 than shown in FIG. 3, but both are valid representations of structures of the present invention. The facilitator 402 is a specialized server agent that is responsible for coordinating agent communications and cooperative problem-solving. The facilitator 402 may also provide a global data store for its client agents, allowing them to adopt a blackboard style of interaction. Note that certain advantages are found in utilizing two or more facilitator agents within the system 400. For example, larger systems can be assembled from multiple facilitator/client groups, each having the sort of structure shown in FIG. 4. All agents that are not facilitators are referred to herein generically as client agents—so called because each acts (in some respects) as a client of some facilitator, which provides communication and other essential services for the client.

The variety of possible client agents is essentially unlimited. Some typical categories of client agents would include application agents 404, meta-agents 406, and user interface agents 408, as depicted in FIG. 4. Application agents 404 denote specialists that provide a collection of services of a particular sort. These services could be domain-independent technologies (such as speech recognition, natural language processing 410, email, and some forms of data retrieval and data mining) or user-specific or domain-specific (such as a travel planning and reservations agent). Application agents may be based on legacy applications or libraries, in which case the agent may be little more than a wrapper that calls a pre-existing API 412, for example. Meta-agents 406 are agents whose role is to assist the facilitator agent 402 in coordinating the activities of other agents. While the facilitator 402 possesses domain-independent coordination strategies, meta-agents 406 can augment these by using domain- and application-specific knowledge or reasoning (including but not limited to rules, learning algorithms and planning).

With further reference to FIG. 4, user interface agents 408 can play an extremely important and interesting role in certain embodiments of the present invention. By way of explanation, in some systems, a user interface agent can be implemented as a collection of "micro-agents", each monitoring a different input modality (point-and-click, handwriting, pen gestures, speech), and collaborating to produce the best interpretation of the current inputs. These micro-agents are depicted in FIG. 4, for example, as Modality Agents 414. While describing such subcategories of client agents is useful for purposes of illustration and understanding, they need not be formally distinguished within the system in preferred implementations of the present invention.

The operation of one preferred embodiment of the present invention will be discussed in greater detail below, but may be briefly outlined as follows. When invoked, a client agent makes a connection to a facilitator, which is known as its parent facilitator. These connections are depicted as a double headed arrow between the client agent and the facilitator agent in FIGS. 3 and 4, for example. Upon connection, an agent registers with its parent facilitator a specification of the capabilities and services it can provide. For example, a natural language agent may register the characteristics of its available natural language vocabulary. (For more details regarding client agent connections, see the discussion of FIG. 8 below.) Later during task completion, when a facilitator determines that the registered services 416 of one of its client agents will help satisfy a goal, the facilitator sends that client a request expressed in the Interagent Communication Language (ICL) 418. (See FIG. 11 below for a more detailed discussion of the facilitator operations involved.) The agent parses this request, processes it, and returns answers or status reports to the facilitator. In processing a request, the client agent can make use of a variety of infrastructure capabilities provided in the preferred embodiment. For example, the client agent can use ICL 418 to request services of other agents, set triggers, and read or write shared data on the facilitator or other client agents that maintain shared data. (See the discussion of FIGS. 9–11 below for a more detailed discussion of request processing.)

The functionality of each client agent are made available to the agent community through registration of the client agent's capabilities with a facilitator 402. A software "wrapper" essentially surrounds the underlying application program performing the services offered by each client. The common infrastructure for constructing agents is preferably supplied by an agent library. The agent library is preferably accessible in the runtime environment of several different programming languages. The agent library preferably minimizes the effort required to construct a new system and maximizes the ease with which legacy systems can be "wrapped" and made compatible with the agent-based architecture of the present invention.

By way of further illustration, a representative application is now briefly presented with reference to FIGS. 5 and 6. In the Automated Office system depicted in FIG. 5, a mobile user with a telephone and a laptop computer can access and task commercial applications such as calendars, databases, and email systems running back at the office. A user interface (UI) agent 408, shown in FIG. 6, runs on the user's local laptop and is responsible for accepting user input, sending requests to the facilitator 402 for delegation to appropriate agents, and displaying the results of the distributed computation. The user may interact directly with a specific remote application by clicking on active areas in the interface, calling up a form or window for that application, and making queries with standard interface dialog mechanisms. Conversely, a user may express a task to be executed by using typed, handwritten, or spoken (over the telephone) English sentences, without explicitly specifying which agent or agents should perform the task.

For instance, if the question "What is my schedule?" is written 420 in the user interface 408, this request will be sent 422 by the UI 408 to the facilitator 402, which in turn will ask 424 a natural language (NL) agent 426 to translate the query into ICL 18. To accomplish this task, the NL agent 426 may itself need to make requests of the agent community to resolve unknown words such as "me" 428 (the UI agent 408 can respond 430 with the name of the current user) or "schedule" 432 (the calendar agent 434 define s this word 436). The resulting ICL expression is then routed by the facilitator 402 to appropriate agents (in this case, the calendar agent 434) to execute the request. Results are sent back 438 to the UI agent 408 for display.

The spoken request "When mail arrives for me about security, notify me immediately." produces a slightly more complex example involving communication among all agents in the system. After translation into ICL as described above, the facilitator installs a trigger 440 on the mail agent 442 to look for new messages about security. When one such message does arrive in its mail spool, the trigger fires, and the facilitator matches the action part of the trigger to capabilities published by the notification agent 446. The notification agent 446 is a meta-agent, as it makes use of rules concerning the optimal use of different output modalities (email, fax, speech generation over the telephone) plus information about an individual user's preferences 448 to determine the best way of relaying a message through available media transfer application agents. After some competitive parallelism to locate the user (the calendar agent 434 and database agent 450 may have different guesses as to where to find the user) and some cooperative parallelism to produce required information (telephone number of location, user password, and an audio file containing a text-to-speech representation of the email message), a telephone agent 452 calls the user, verifying its identity through touchtones, and then play the message.

The above example illustrates a number of inventive features. As new agents connect to the facilitator, registering capability specifications and natural language vocabulary, what the user can say and do dynamically changes; in other words, the ICL is dynamically expandable. For example, adding a calendar agent to the system in the previous example and registering its capabilities enables users to ask natural language questions about their "schedule" without any need to revise code for the facilitator, the natural language agents, or any other client agents. In addition, the interpretation and execution of a task is a distributed process, with no single agent defining the set of possible inputs to the system. Further, a single request can produce cooperation and flexible communication among many agents, written in different programming languages and spread across multiple machines.

Design Philosophy and Considerations

One preferred embodiment provides an integration mechanism for heterogeneous applications in a distributed infrastructure, incorporating some of the dynamism and extensibility of blackboard approaches, the efficiency associated with mobile objects, plus the rich and complex interactions of communicating agents. Design goals for preferred embodiments of the present invention may be categorized under the general headings of interoperation and cooperation, user interfaces, and software engineering. These design goals are not absolute requirements, nor will they necessarily be satisfied by all embodiments of the present invention, but rather simply reflect the inventor's currently preferred design philosophy.

Versatile Mechanisms of Interoperation and Cooperation

Interoperation refers to the ability of distributed software components—agents—to communicate meaningfully. While every system-building framework must provide mechanisms of interoperation at some level of granularity, agent-based frameworks face important new challenges in this area. This is true primarily because autonomy, the hallmark of individual agents, necessitates greater flexibility in interactions within communities of agents. Coordination refers to the mechanisms by which a community of agents is able to work together productively on some task. In these areas, the goals for our framework are to provide flexibility in assembling communities of autonomous service providers, provide flexibility in structuring cooperative interactions, impose the right amount of structure, as well as include legacy and "owned-elsewhere" applications.

Provide flexibility in assembling communities of autonomous service providers—both at development time and at runtime. Agents that conform to the linguistic and ontological requirements for effective communication should be able to participate in an agent community, in various combinations, with minimal or near minimal prerequisite knowledge of the characteristics of the other players. Agents with duplicate and overlapping capabilities should be able to coexist within the same community, with the system making optimal or near optimal use of the redundancy.

Provide flexibility in structuring cooperative interactions among the members of a community of agents. A framework preferably provides an economical mechanism for setting up a variety of interaction patterns among agents, without requiring an inordinate amount of complexity or infrastructure within the individual agents. The provision of a service should be independent or minimally dependent upon a particular configuration of agents.

Impose the right amount of structure on individual agents. Different approaches to the construction of multi-agent systems impose different requirements on the individual agents. For example, because KQML is neutral as to the content of messages, it imposes minimal structural requirements on individual agents. On the other hand, the BDI paradigm tends to impose much more demanding requirements, by making assumptions about the nature of the programming elements that are meaningful to individual agents. Preferred embodiments of the present invention should fall somewhere between the two, providing a rich set of interoperation and coordination capabilities, without precluding any of the software engineering goals defined below.

Include legacy and "owned-elsewhere" applications. Whereas legacy usually implies reuse of an established system fully controlled by the agent-based system developer, owned-elsewhere refers to applications to which the developer has partial access, but no control. Examples of owned-elsewhere applications include data sources and services available on the World Wide Web, via simple form-based interfaces, and applications used cooperatively within a virtual enterprise, which remain the properties of separate corporate entities. Both classes of application must preferably be able to interoperate, more or less as full-fledged members of the agent community, without requiring an overwhelming integration effort.

Human-Oriented User Interfaces

Systems composed of multiple distributed components, and possibly dynamic configurations of components, require the crafting of intuitive user interfaces to provide conceptually natural interaction mechanisms, treat users as privileged members of the agent community and support collaboration.

Provide conceptually natural interaction mechanisms with multiple distributed components. When there are numerous disparate agents, and/or complex tasks implemented by the system, the user should be able to express requests without having detailed knowledge of the individual agents. With speech recognition, handwriting recognition, and natural language technologies becoming more mature, agent architectures should preferably support these forms of input playing increased roles in the tasking of agent communities.

Preferably treat users as privileged members of the agent community by providing an appropriate level of task specification within software agents, and reusable translation mechanisms between this level and the level of human requests, supporting constructs that seamlessly incorporate interactions between both human-interface and software types of agents.

Preferably support collaboration (simultaneous work over shared data and processing resources) between users and agents.

Realistic Software Engineering Requirements

System-building frameworks should preferably address the practical concerns of real-world applications by the specification of requirements which preferably include: Minimize the effort required to create new agents, and to wrap existing applications. Encourage reuse, both of domain-independent and domain-specific components. The concept of agent orientation, like that of object orientation, provides a natural conceptual framework for reuse, so long as mechanisms for encapsulation and interaction are structured appropriately. Support lightweight, mobile platforms. Such platforms should be able to serve as hosts for agents, without requiring the installation of a massive environment. It should also be possible to construct individual agents that are relatively small and modest in their processing requirements. Minimize platform and language barriers. Creation of new agents, as well as wrapping of existing applications, should not require the adoption of a new language or environment.

Mechanisms of Cooperation

Cooperation among agents in accordance with the present invention is preferably achieved via messages expressed in a common language, ICL. Cooperation among agent is further preferably structured around a three-part approach: providers of services register capabilities specifications with a facilitator, requesters of services construct goals and relay them to a facilitator, and facilitators coordinate the efforts of the appropriate service providers in satisfying these goals.

The Interagent Communication Language (ICL)

Interagent Communication Language ("ICL") 418 refers to an interface, communication, and task coordination language preferably shared by all agents, regardless of what platform they run on or what computer language they are programmed in. ICL may be used by an agent to task itself or some subset of the agent community. Preferably, ICL allows agents to specify explicit control parameters while simultaneously supporting expression of goals in an under-specified, loosely constrained manner. In a further preferred embodiment, agents employ ICL to perform queries, execute actions, exchange information, set triggers, and manipulate data in the agent community.

In a further preferred embodiment, a program element expressed in ICL is the event. The activities of every agent, as well as communications between agents, are preferably structured around the transmission and handling of events. In communications, events preferably serve as messages between agents; in regulating the activities of individual agents, they may preferably be thought of as goals to be satisfied. Each event preferably has a type, a set of parameters, and content. For example, the agent library procedure oaa_Solve can be used by an agent to request services of other agents. A call to oaa_Solve, within the code of agent A, results in an event having the form ev_post_solve(Goal, Params) going from A to the facilitator, where ev_post_solve is the type, Goal is the content, and Params is a list of parameters. The allowable content and parameters preferably vary according to the type of the event.

The ICL preferably includes a layer of conversational protocol and a content layer. The conversational layer of ICL is defined by the event types, together with the parameter lists associated with certain of these event types. The content layer consists of the specific goals, triggers, and data elements that may be embedded within various events.

The ICL conversational protocol is preferably specified using an orthogonal, parameterized approach, where the conversational aspects of each element of an interagent conversation are represented by a selection of an event type and a selection of values from at least one orthogonal set of parameters. This approach offers greater expressiveness than an approach based solely on a fixed selection of speech acts, such as embodied in KQML. For example, in KQML, a request to satisfy a query can employ either of the performatives ask all or ask one. In ICL, on the other hand, this type of request preferably is expressed by the event type ev_post_solve, together with the solution_limit(N) parameter—where N can be any positive integer. (A request for all solutions is indicated by the omission of the solution_limit parameter.) The request can also be accompanied by other parameters, which combine to further refine its semantics. In KQML, then, this example forces one to choose between two possible conversational options, neither of which may be precisely what is desired. In either case, the performative chosen is a single value that must capture the entire conversational characterization of the communication. This requirement raises a difficult challenge for the language designer, to select a set of performatives that provides the desired functionality without becoming unmanageably large. Consequently, the debate over the right set of performatives has consumed much discussion within the KQML community.

The content layer of the ICL preferably supports unification and other features found in logic programming language environments such as PROLOG. In some embodiments, the content layer of the ICL is simply an extension of at least one programming language. For example, the Applicants have found that PROLOG is suitable for implementing and extending into the content layer of the ICL. The agent libraries preferably provide support for constructing, parsing, a nd manipulating ICL expressions. It is possible to embed content expressed in other languages within an ICL event. However, expressing content in ICL simplifies the facilitator's access to the content, as well as the conversational layer, in delegating requests. This gives the facilitator more information about the nature of a request and helps the facilitator decompose compound requests and delegate the sub-requests.

Further, ICL expressions preferably include, in addition to events, at least one of the following: capabilities declarations, requests for services, responses to requests, trigger specifications, and shared data elements. A further preferred embodiment of the present invention incorporates ICL expressions including at least all of the following: events, capabilities declarations, requests for services, responses to requests, trigger specifications, and shared data elements.

Providing Services: Specifying "Solvables"

In a preferred embodiment of the present invention, every participating agent defines and publishes a set of capability declarations, expressed in ICL, describing the services that it provides. These declarations establish a high-level interface to the agent. This interface is used by a facilitator in communicating with the agent, and, most important, in delegating service requests (or parts of requests) to the agent. Partly due to the use of PROLOG as a preferred basis for ICL, these capability declarations are referred as solvables. The agent library preferably provides a set of procedures allowing an agent to add, remove, and modify its solvables, which it may preferably do at any time after connecting to its facilitator.

There are preferably at least two major types of solvables: procedure solvables and data solvables. Intuitively, a procedure solvable performs a test or action, whereas a data solvable provides access to a collection of data. For example, in creating an agent for a mail system, procedure solvables might be defined for sending a message to a person, testing whether a message about a particular subject has arrived in the mail queue, or displaying a particular message onscreen. For a database wrapper agent, one might define a distinct data solvable corresponding to each of the relations present in the database. Often, a data solvable is used to provide a shared data store, which may be not only queried, but also updated, by various agents having the required permissions.

There are several primary technical differences between these two types of solvables. First, each procedure solvable must have a handler declared and defined for it, whereas this is preferably not necessary for a data solvable. The handling of requests for a data solvable is preferably provided transparently by the agent library. Second, data solvables are preferably associated with a dynamic collection of facts (or clauses), which may be further preferably modified at runtime, both by the agent providing the solvable, and by other agents (provided they have the required permissions). Third, special features, available for use with data solvables, preferably facilitate maintaining the associated facts. In spite of these differences, it should be noted that the mechanism of use by which an agent requests a service is the same for the two types of solvables.

In one embodiment, a request for one of an agent's services normally arrives in the form of an event from the agent's facilitator. The appropriate handler then deals with this event. The handler may be coded in whatever fashion is most appropriate, depending on the nature of the task, and the availability of task-specific libraries or legacy code, if any. The only hard requirement is that the handler return an appropriate response to the request, expressed in ICL. Depending on the nature of the request, this response could be an indication of success or failure, or a list of solutions (when the request is a data query).

A solvable preferably has three parts: a goal, a list of parameters, and a list of permissions, which are declared using the format:

solvable(Goal, Parameters, Permissions)

The goal of a solvable, which syntactically takes the preferable form of an ICL structure, is a logical representation of the service provided by the solvable. (An ICL structure consists of a functor with 0 or more arguments. For example, in the structure a(b,c), 'a' is the functor, and 'b' and 'c' the arguments.) As with a PROLOG structure, the goal's arguments themselves may preferably be structures.

Various options can be included in the parameter list, to refine the semantics associated with the solvable. The type parameter is preferably used to say whether the solvable is data or procedure. When the type is procedure, another parameter may be used to indicate the handler to be associated with the solvable. Some of the parameters appropriate for a data solvable are mentioned elsewhere in this application. In either case (procedure or data solvable), the private parameter may be preferably used to restrict the use of a solvable to the declaring agent when the agent intends the solvable to be solely for its internal use but wishes to take advantage of the mechanisms in accordance with the present invention to access it, or when the agent wants the solvable to be available to outside agents only at selected times. In support of the latter case, it is preferable for the agent to change the status of a solvable from private to non-private at any time.

The permissions of a solvable provide mechanisms by which an agent may preferably control access to its services allowing the agent to restrict calling and writing of a solvable to itself and/or other selected agents. (Calling means requesting the service encapsulated by a solvable, whereas writing means modifying the collection of facts associated with a data solvable.) The default permission for every solvable in a further preferred embodiment of the present invention is to be callable by anyone, and for data solvables to be writable by anyone. A solvable's permissions can preferably be changed at any time, by the agent providing the solvable.

For example, the solvables of a simple email agent might include:

```
solvable(send_message(email, +ToPerson, +Params),
    [type(procedure), callback(send_mail)],
[ ])
solvable(last_message(email, -MessageId),
[type(data), single_value(true)],
[write(true)]),
solvable(get_message(email, +MessageId, -Msg),
[type(procedure), callback(get_mail)],
    [ ])
```

The symbols '+' and '−', indicating input and output arguments, are at present used only for purposes of documentation. Most parameters and permissions have default values, and specifications of default values may be omitted from the parameters and permissions lists.

Defining an agent's capabilities in terms of solvable declarations effectively creates a vocabulary with which other agents can communicate with the new agent. Ensuring that agents will speak the same language and share a common, unambiguous semantics of the vocabulary involves ontology. Agent development tools and services (automatic translations of solvables by the facilitator) help address this issue; additionally, a preferred embodiment of the present invention will typically rely on vocabulary from either formally engineered ontologies for specific domains or from ontologies constructed during the incremental development of a body of agents for several applications or from both specific domain ontologies and incrementally developed ontologies. Several example tools and services are described in Cheyer et al.'s paper entitled "Development Tools for the Open Agent Architecture," as presented at the Practical Application of Intelligent Agents and Multi-Agent Technology (PAAM 96), London, April 1996.

Although the present invention imposes no hard restrictions on the form of solvable declarations, two common usage conventions illustrate some of the utility associated with solvables.

Classes of services are often preferably tagged by a particular type. For instance, in the example above, the "last_message" and "get message" solvables are specialized for email, not by modifying the names of the services, but rather by the use of the 'email' parameter, which serves during the execution of an ICL request to select (or not) a specific type of message.

Actions are generally written using an imperative verb as the functor of the solvable in a preferred embodiment of the present invention, the direct object (or item class) as the first argument of the predicate, required arguments following, and then an extensible parameter list as the last argument. The parameter list can hold optional information usable by the function. The ICL expression generated by a natural language parser often makes use of this parameter list to store prepositional phrases and adjectives.

As an illustration of the above two points, "Send mail to Bob about lunch" will be translated into an ICL request send_message(email, 'Bob Jones', [subject(lunch)]), whereas "Remind Bob about lunch" would leave the transport unspecified (send_message(KIND, 'Bob Jones', [subject(lunch)])), enabling all available message transfer agents (e.g., fax, phone, mail, pager) to compete for the opportunity to carry out the request.

Requesting Services

An agent preferably requests services of the community of agent by delegating tasks or goals to its facilitator. Each request preferably contains calls to one or more agent solvables, and optionally specifies parameters containing advice to help the facilitator determine how to execute the task. Calling a solvable preferably does not require that the agent specify (or even know of) a particular agent or agents to handle the call. While it is possible to specify one or more agents using an address parameter (and there are situations in which this is desirable), in general it is advantageous to leave this delegation to the facilitator. This greatly reduces the hard-coded component dependencies often found in other distributed frameworks. The agent libraries of a preferred embodiment of the present invention provide an agent with a single, unified point of entry for requesting services of other agents: the library procedure oaa_Solve. In the style of logic programming, oaa_Solve may preferably be used both to retrieve data and to initiate actions, so that calling a data solvable looks the same as calling a procedure solvable.

Complex Goal Expressions

A powerful feature provided by preferred embodiments of the present invention is the ability of a client agent (or a user) to submit compound goals of an arbitrarily complex nature to a facilitator. A compound goal is a single goal expression that specifies multiple sub-goals to be performed. In speaking of a "complex goal expression" we mean that a single goal expression that expresses multiple sub-goals can potentially include more than one type of logical connector (e.g., AND, OR, NOT), and/or more than one level of logical nesting (e.g., use of parentheses), or the substantive equivalent. By way of further clarification, we note that when speaking of an "arbitrarily complex goal expression" we mean that goals are expressed in a language or syntax that allows expression of such complex goals when appropriate or when desired, not that every goal is itself necessarily complex.

It is contemplated that this ability is provided through an interagent communication language having the necessary syntax and semantics. In one example, the goals may take the form of compound goal expressions composed using operators similar to those employed by PROLOG, that is, the comma for conjunction, the semicolon for disjunction, the arrow for conditional execution, etc. The present invention also contemplates significant extensions to PROLOG syntax and semantics. For example, one embodiment incorporates a "parallel disjunction" operator indicating that the disjuncts are to be executed by different agents concurrently. A further embodiment supports the specification of whether a given sub-goal is to be executed breadth-first or depth-first.

A further embodiment supports each sub-goal of a compound goal optionally having an address and/or a set of parameters attached to it. Thus, each sub-goal takes the form.

Address:Goal::Parameters where both Address and Parameters are optional.

An address, if present, preferably specifies one or more agents to handle the given goal, and may employ several different types of referring expression: unique names, symbolic names, and shorthand names. Every agent has preferably a unique name, assigned by its facilitator, which relies upon network addressing schemes to ensure its global uniqueness. Preferably, agents also have self-selected symbolic names (for example, "mail"), which are not guaranteed to be unique. When an address includes a symbolic name, the facilitator preferably takes this to mean that all agents having that name should be called upon. Shorthand names include 'self' and 'parent' (which refers to the agent's facilitator). The address associated with a goal or sub-goal is preferably always optional. When an address is not present, it is the facilitator's job to supply an appropriate address.

The distributed execution of compound goals becomes particularly powerful when used in conjunction with natural language or speech-enabled interfaces, as the query itself may specify how functionality from distinct agents will be combined. As a simple example, the spoken utterance "Fax it to Bill Smith's manager." can be translated into the following compound ICL request:

oaa_Solve((manager('Bill Smith', M), fax(it,M,[ ])), [strategy(action)])

Note that in this ICL request there are two sub-goals, "manager('Bill Smith',M)" and "fax(it,M,[ ])," and a single global parameter "strategy(action)." According to the present invention, the facilitator is capable of mapping global parameters in order to apply the constraints or advice across the separate sub-goals in a meaningful way. In this instance, the global parameter strategy(action) implies a parallel constraint upon the first sub-goal; i.e., when there are multiple agents that can respond to the manager sub-goal, each agent should receive a request for service. In contrast, for the second sub-goal, parallelism should not be inferred from the global parameter strategy(action) because such an inference would possibly result in the transmission of duplicate facsimiles.

Refining Service Requests

In a preferred embodiment of the present invention, parameters associated with a goal (or sub-goal) can draw on useful features to refine the request's meaning. For example, it is frequently preferred to be able to specify whether or not solutions are to be returned synchronously; this is done using the reply parameter, which can take any of the values synchronous, asynchronous, or none. As another example, when the goal is a non-compound query of a data solvable, the cache parameter may preferably be used to request local caching of the facts associated with that solvable. Many of the remaining parameters fall into two categories: feedback and advice.

Feedback parameters allow a service requester to receive information from the facilitator about how a goal was handled. This feedback can include such things as the identities of the agents involved in satisfying the goal, and the amount of time expended in the satisfaction of the goal.

Advice parameters preferably give constraints or guidance to the facilitator in completing and interpreting the goal. For example, a solution_limit parameter preferably allows the requester to say how many solutions it is interested in; the facilitator and/or service providers are free to use this information in optimizing their efforts. Similarly, a time_limit is preferably used to say how long the requester is willing to wait for solutions to its request, and, in a multiple facilitator system, a level_limit may preferably be used to say how remote the facilitators may be that are consulted in the search for solutions. A priority parameter is preferably used to indicate that a request is more urgent than previous requests that have not yet been satisfied. Other preferred advice parameters include but are not limited to parameters used to tell the facilitator whether parallel satisfaction of the parts of a goal is appropriate, how to combine and filter results arriving from multiple solver agents, and whether the requester itself may be considered a candidate solver of the sub-goals of a request.

Advice parameters preferably provide an extensible set of low-level, orthogonal parameters capable of combining with the ICL goal language to fully express how information should flow among participants. In certain preferred embodiments of the present invention, multiple parameters can be grouped together and given a group name. The resulting high-level advice parameters can preferably be used to express concepts analogous to KQML's performatives, as well as define classifications of problem types. For instance, KQML's "ask_all" and "ask_one" performatives would be represented as combinations of values given to the parameters reply, parallel_ok, and solution_limit. As an example of a higher-level problem type, the strategy "math_problem" might preferably send the query to all appropriate math solvers in parallel, collect their responses, and signal a conflict if different answers are returned. The strategy "essay question" might preferably send the request to all appropriate participants, and signal a problem (i.e., cheating) if any of the returned answers are identical.

Facilitation

In a preferred embodiment of the present invention, when a facilitator receives a compound goal, its job is to construct a goal satisfaction plan and oversee its satisfaction in an optimal or near optimal manner that is consistent with the specified advice. The facilitator of the present invention maintains a knowledge base that records the capabilities of a collection of agents, and uses that knowledge to assist requesters and providers of services in making contact.

FIG. 7 schematically shows data structures 700 internal to a facilitator in accordance with one embodiment of the present invention. Consider the function of a Agent Registry 702 in the present invention. Each registered agent may be seen as associated with a collection of fields found within its parent facilitator such as shown in the figure. Each registered agent may optionally possess a Symbolic Name which would be entered into field 704. As mentioned elsewhere, Symbolic Names need not be unique to each instance of an agent. Note that an agent may in certain preferred embodiments of the present invention possess more than one Symbolic Name. Such Symbolic Names would each be found through their associations in the Agent Registry entries. Each agent, when registered, must possess a Unique Address, which is entered into the Unique Address field 706.

With further reference to FIG. 7, each registered agent may be optionally associated with one or more capabilities, which have associated Capability Declaration fields 708 in the parent facilitator Agent Registry 702. These capabilities may define not just functionality, but may further provide a utility parameter indicating, in some manner (e.g., speed, accuracy, etc), how effective the agent is at providing the declared capability. Each registered agent may be optionally associated with one or more data components, which have associated Data Declaration fields 710 in the parent facilitator Agent Registry 702. Each registered agent may be optionally associated with one or more triggers, which preferably could be referenced through their associated Trigger Declaration fields 712 in the parent facilitator Agent Registry 702. Each registered agent may be optionally associated with one or more tasks, which preferably could be referenced through their associated Task Declaration fields 714 in the parent facilitator Agent Registry 702. Each registered agent may be optionally associated with one or more Process Characteristics, which preferably could be referenced through their associated Process Characteristics Declaration fields 716 in the parent facilitator Agent Registry 702. Note that these characteristics in certain preferred embodiments of the present invention may include one or more of the following: Machine Type (specifying what type of computer may run the agent), Language (both computer and human interface).

A facilitator agent in certain preferred embodiments of the present invention further includes a Global Persistent Database 720. The database 720 is composed of data elements which do not rely upon the invocation or instantiation of client agents for those data elements to persist. Examples of data elements which might be present in such a database include but are not limited to the network address of the facilitator agent's server, facilitator agent's server accessible network port list, firewalls, user lists, and security options regarding the access of server resources accessible to the facilitator agent.

A simplified walk through of operations involved in creating a client agent, a client agent initiating a service request, a client agent responding to a service request and a facilitator agent responding to a service request are including hereafter by way of illustrating the use of such a system. These figures and their accompanying discussion are provided by way of illustration of one preferred embodiment of the present invention and are not intended to limit the scope of the present invention.

FIG. 8 depicts operations involved in instantiating a client agent with its parent facilitator in accordance with a preferred embodiment of the present invention. The operations begin with starting the Agent Registration in a step 800. In a next step 802, the Installer, such as a client or facilitator agent, invokes a new client agent. It will be appreciated that any computer entity is capable of invoking a new agent. The system then instantiates the new client agent in a step 804. This operation may involve resource allocations somewhere in the network on a local computer system for the client agent, which will often include memory as well as placement of references to the newly instantiated client agent in internal system lists of agents within that local computing system. Once instantiated, the new client and its parent facilitator establish a communications link in a step 806. In certain preferred embodiments, this communications link involves selection of one or more physical transport mechanisms for this communication. Once established, the client agent transmits it profile to the parent facilitator in a step 808. When received, the parent facilitator registers the client agent in a step 810. Then, at a step 812, a client agent has been instantiated in accordance with one preferred embodiment of the present invention.

FIG. 9 depicts operations involved in a client agent initiating a service request and receiving the response to that service request in accordance with a preferred embodiment of the present invention. The method of FIG. 9 begins in a step 900, wherein any initialization or other such procedures may be performed. Then, in a step 902, the client agent determines a goal to be achieved (or solved). This goal is then translated in a step 904 into ICL, if it is not already formulated in it. The goal, now stated in ICL, is then transmitted to the client agent's parent facilitator in a step 906. The parent facilitator responds to this service request and at a later time, the client agent receives the results of the request in a step 908, operations of FIG. 9 being complete in a done step 910.

FIG. 10 depicts operations involved in a client agent responding to a service request in accordance with a preferred embodiment of the present invention. Once started in a step 1000, the client agent receives the service request in a step 1002. In a next step 1004, the client agent parses the received request from ICL. The client agent then determines if the service is available in a step 1006. If it is not, the client agent returns a status report to that effect in a step 1008. If the service is available, control is passed to a step 1010 where the client performs the requested service. Note that in completing step 1010 the client may form complex goal expressions, requesting results for these solvables from the facilitator agent. For example, a fax agent might fax a document to a certain person only after requesting and receiving a fax number for that person. Subsequently, the client agent either returns the results of the service and/or a status report in a step 1012. The operations of FIG. 10 are complete in a done step 1014.

FIG. 11 depicts operations involved in a facilitator agent response to a service request in accordance with a preferred embodiment of the present invention. The start of such operations in step 1100 leads to the reception of a goal request in a step 1102 by the facilitator. This request is then parsed and interpreted by the facilitator in a step 1104. The facilitator then proceeds to construct a goal satisfaction plan in a next step 1106. In steps 1108 and 1110, respectively, the facilitator determines the required sub-goals and then selects agents suitable for performing the required sub-goals. The facilitator then transmits the sub-goal requests to the selected agents in a step 1112 and receives the results of these transmitted requests in a step 1114. It should be noted that the actual implementation of steps 1112 and 1114 are dependent upon the specific goal satisfaction plan. For instance, certain sub-goals may be sent to separate agents in parallel, while transmission of other sub-goals may be postponed until receipt of particular answers. Further, certain requests may generate multiple responses that generate additional sub-goals. Once the responses have been received, the facilitator determines whether the original requested goal has been completed in a step 1118. If the original requested goal has not been completed, the facilitator recursively repeats the operations 1106 through 1116. Once the original requested goal is completed, the facilitator returns the results to the requesting agent 1118 and the operations are done at 1120.

A further preferred embodiment of the present invention incorporates transparent delegation, which means that a requesting agent can generate a request, and a facilitator can manage the satisfaction of that request, without the requester needing to have any knowledge of the identities or locations of the satisfying agents. In some cases, such as when the request is a data query, the requesting agent may also be oblivious to the number of agents involved in satisfying a request. Transparent delegation is possible because agents' capabilities (solvables) are treated as an abstract description of a service, rather than as an entry point into a library or body of code.

A further preferred embodiment of the present invention incorporates facilitator handling of compound goals, preferably involving three types of processing: delegation, optimization and interpretation.

Delegation processing preferably supports facilitator determination of which specific agents will execute a compound goal and how such a compound goal's sub-goals will be combined and the sub-goal results routed. Delegation involves selective application of global and local constraint and advice parameters onto the specific sub-goals. Delegation results in a goal that is unambiguous as to its meaning and as to the agents that will participate in satisfying it.

Optimization processing of the completed goal preferably includes the facilitator using sub-goal parallelization where appropriate. Optimization results in a goal whose interpretation will require as few exchanges as possible, between the facilitator and the satisfying agents, and can exploit parallel efforts of the satisfying agents, wherever this does not affect the goal's meaning.

Interpretation processing of the optimized goal. Completing the addressing of a goal involves the selection of one or more agents to handle each of its sub-goals (that is, each sub-goal for which this selection has not been specified by the requester). In doing this, the facilitator uses its knowledge of the capabilities of its client agents (and possibly of other facilitators, in a multi-facilitator system). It may also use strategies or advice specified by the requester, as explained below. The interpretation of a goal involves the coordination of requests to the satisfying agents, and assembling their responses into a coherent whole, for return to the requester.

A further preferred embodiment of present invention extends facilitation so the facilitator can employ strategies and advice given by the requesting agent, resulting in a variety of interaction patterns that may be instantiated in the satisfaction of a request.

A further preferred embodiment of present invention handles the distribution of both data update requests and requests for installation of triggers, preferably using some of the same strategies that are employed in the delegation of service requests.

Note that the reliance on facilitation is not absolute; that is, there is no hard requirement that requests and services be matched up by the facilitator, or that interagent communications go through the facilitator. There is preferably support in the agent library for explicit addressing of requests. However, a preferred embodiment of the present invention encourages employment the paradigm of agent communities, minimizing their development effort, by taking advantage of the facilitator's provision of transparent delegation and handling of compound goals.

A facilitator is preferably viewed as a coordinator, not a controller, of cooperative task completion. A facilitator preferably never initiates an activity. A facilitator preferably responds to requests to manage the satisfaction of some goal, the update of some data repository, or the installation of a trigger by the appropriate agent or agents. All agents can preferably take advantage of the facilitator's expertise in delegation, and its up-to-date knowledge about the current membership of a dynamic community. The facilitator's coordination services often allows the developer to lessen the complexity of individual agents, resulting in a more manageable software development process, and enabling the creation of lightweight agents.

Maintaining Data Repositories

The agent library supports the creation, maintenance, and use of databases, in the form of data solvables. Creation of a data solvable requires only that it be declared. Querying a data solvable, as with access to any solvable, is done using oaa_Solve.

A data solvable is conceptually similar to a relation in a relational database. The facts associated with each solvable are maintained by the agent library, which also handles incoming messages containing queries of data solvables. The default behavior of an agent library in managing these facts may preferably be refined, using parameters specified with the solvable's declaration. For example, the parameter single_value preferably indicates that the solvable should only contain a single fact at any given point in time. The parameter unique_values preferably indicates that no duplicate values should be stored.

Other parameters preferably allow data solvables use of the concepts of ownership and persistence. For implementing shared repositories, it is often preferable to maintain a record of which agent created each fact of a data solvable with the creating agent being preferably considered the fact's owner. In many applications, it is preferable to remove an agent's facts when that agent goes offline (for instance, when the agent is no longer participating in the agent community, whether by deliberate termination or by malfunction). When a data solvable is declared to be non-persistent, its facts are automatically maintained in this way, whereas a persistent data solvable preferably retains its facts until they are explicitly removed.

A further preferred embodiment of present invention supports an agent library through procedures by which agents can update (add, remove, and replace) facts belonging to data solvables, either locally or on other agents, given that they have preferably the required permissions. These procedures may preferably be refined using many of the same parameters that apply to service requests. For example, the address parameter preferably specifies one or more particular agents to which the update request applies. In its absence, just as with service requests, the update request preferably goes to all agents providing the relevant data solvable. This default behavior can be used to maintain coordinated "mirror" copies of a data set within multiple agents, and can be useful in support of distributed, collaborative activities.

Similarly, the feedback parameters, described in connection with oaa_Solve, are preferably available for use with data maintenance requests.

A further preferred embodiment of present invention supports ability to provide data solvables not just to client agents, but also to facilitator agents. Data solvables can preferably created, maintained and used by a facilitator. The facilitator preferably can, at the request of a client of the facilitator, create, maintain and share the use of data solvables with all the facilitator's clients. This can be useful with relatively stable collections of agents, where the facilitator's workload is predictable.

Using a Blackboard Style of Communication

In a further preferred embodiment of present invention, when a data solvable is publicly readable and writable, it acts essentially as a global data repository and can be used cooperatively by a group of agents. In combination with the use of triggers, this allows the agents to organize their efforts around a "blackboard" style of communication.

As an example, the "DCG-NL" agent (one of several existing natural language processing agents), provides natural language processing services for a variety of its peer agents, expects those other agents to record, on the facilitator, the vocabulary to which they are prepared to respond, with an indication of each word's part of speech, and of the logical form (ICL sub-goal) that should result from the use of that word. In a further preferred embodiment of present invention, the NL agent, preferably when it comes online, preferably installs a data solvable for each basic part of speech on its facilitator. For instance, one such solvable would be:

solvable(noun(Meaning, Syntax), [ ], [ ])

Note that the empty lists for the solvable's permissions and parameters are acceptable here, since the default permissions and parameters provide appropriate functionality.

A further preferred embodiment of present invention incorporating an Office Assistant system as discussed herein or similar to the discussion here supports several agents making use of these or similar services. For instance, the database agent uses the following call, to library procedure oaa__AddData, to post the noun 'boss', and to indicate that the "meaning" of boss is the concept 'manager':

oaa__AddData(noun(manager, atom(boss)), [address (parent)])

Autonomous Monitoring with Triggers

A further preferred embodiment of present invention includes support for triggers, providing a general mechanism for requesting some action be taken when a set of conditions is met. Each agent can preferably install triggers either locally, for itself, or remotely, on its facilitator or peer agents. There are preferably at least four types of triggers: communication, data, task, and time. In addition to a type, each trigger preferably specifies at least a condition and an action, both preferably expressed in ICL. The condition indicates under what circumstances the trigger should fire, and the action indicates what should happen when it fires. In addition, each trigger can be set to fire either an unlimited number of times, or a specified number of times, which can be any positive integer.

Triggers can be used in a variety of ways within preferred embodiments of the present invention. For example, triggers can be used for monitoring external sensors in the execution environment, tracking the progress of complex tasks, or coordinating communications between agents that are essential for the synchronization of related tasks. The installation of a trigger within an agent can be thought of as a representation of that agent's commitment to carry out the specified action, whenever the specified condition holds true.

Communication triggers preferably allow any incoming or outgoing event (message) to be monitored. For instance, a simple communication trigger may say something like: "Whenever a solution to a goal is returned from the facilitator, send the result to the presentation manager to be displayed to the user."

Data triggers preferably monitor the state of a data repository (which can be maintained on a facilitator or a client agent). Data triggers' conditions may be tested upon the addition, removal, or replacement of a fact belonging to a data solvable. An example data trigger is: "When 15 users are simultaneously logged on to a machine, send an alert message to the system administrator."

Task triggers preferably contain conditions that are tested after the processing of each incoming event and whenever a timeout occurs in the event polling. These conditions may specify any goal executable by the local ICL interpreter, and most often are used to test when some solvable becomes satisfiable. Task triggers are useful in checking for task-specific internal conditions. Although in many cases such conditions are captured by solvables, in other cases they may not be. For example, a mail agent might watch for new incoming mail, or an airline database agent may monitor which flights will arrive later than scheduled. An example task trigger is: "When mail arrives for me about security, notify me immediately."

Time triggers preferably monitor time conditions. For instance, an alarm trigger can be set to fire at a single fixed point in time (e.g., "On December 23rd at 3 pm"), or on a recurring basis (e.g., "Every three minutes from now until noon").

Triggers are preferably implemented as data solvables, declared implicitly for every agent. When requesting that a trigger be installed, an agent may use many of the same parameters that apply to service and data maintenance requests.

A further preferred embodiment of present invention incorporates semantic support, in contrast with most programming methodologies, of the agent on which the trigger is installed only having to know how to evaluate the conditional part of the trigger, not the consequence. When the trigger fires, the action is delegated to the facilitator for execution. Whereas many commercial mail programs allow rules of the form "When mail arrives about XXX, [forward it, delete it, archive it]", the possible actions are hard-coded and the user must select from a fixed set.

A further preferred embodiment of present invention, the consequence of a trigger may be any compound goal executable by the dynamic community of agents. Since new agents preferably define both functionality and vocabulary, when an unanticipated agent (for example, a fax agent) joins the community, no modifications to existing code is required for a user to make use of it—"When mail arrives, fax it to Bill Smith."

The Agent Library

In a preferred embodiment of present invention, the agent library provides the infrastructure for constructing an agent-based system. The essential elements of protocol (involving the details of the messages that encapsulate a service request and its response) are preferably made transparent to simplify the programming applications. This enables the developer to focus functionality, rather than message construction details and communication details. For example, to request a service of an other agent, an agent preferably calls the library procedure oaa__Solve. This call results in a message to a facilitator, which will exchange messages with one or more service providers, and then send a message containing the desired results to the requesting agent. These results are returned via one of the arguments of oaa__Solve. None of the messages involved in this scenario is explicitly constructed by the agent developer. Note that this describes the synchronous use of oaa__Solve.

In another preferred embodiment of present invention, an agent library provides both intraagent and interagent infrastructure; that is, mechanisms supporting the internal structure of individual agents, on the one hand, and mechanisms of cooperative interoperation between agents, on the other. Note that most of the infrastructure cuts across this boundary with many of the same mechanisms supporting both agent internals and agent interactions in an integrated fashion. For example, services provided by an agent preferably can be accessed by that agent through the same procedure (oaa_Solve) that it would employ to request a service of another agent (the only difference being in the address parameter accompanying the request). This helps the developer to reuse code and avoid redundant entry points into the same functionality.

Both of the preferred characteristics described above (transparent construction of messages and integration of intraagent with interagent mechanisms) apply to most other library functionality as well, including but not limited to data management and temporal control mechanisms.

Illustrative Applications

To further illustrate the technology of the preferred embodiment, we will next present and discuss two sample applications of the present inventions.

Unified Messaging

A further preferred embodiment of present invention incorporates a Unified Messaging application extending the Automated Office application presented previously herein with an emphasis on ubiquitous access and dynamic presentation of the information and services supported by the agent community. The agents used in this application are depicted in FIG. 12.

A hypothetical example of realistic dialog using a preferred embodiment of the present invention can provide insight into how systems may preferably be built using the present invention. In this scenario, the user, with only a telephone as an interface, is planning a trip to Boston where he will soon give a presentation. Capitalized sentences are phrases spoken by the user into the telephone and processed by a phone agent 452.

Responses, unless otherwise indicated, are spoken by the system using text-to-speech generation agent 454.

1.1 Welcome to SRI International. Please enter your user ID and password.

<User Enters Touchtone ID and Password>

Good to see you again Adam Cheyer. I am listening to you.

Every user interface agent 408, including the telephone agent 452, should know the identify of its user. This information is used in resolving anaphoric references such as "me" and "I", and allows multiple user interfaces operated by the same user to work together.

1.2 WHAT IS TODAY'S SCHEDULE?

Here is today's schedule for Adam Cheyer:

At 10 am for 1 hour, meeting with Dave.

At 3 pm for 1 hour, presentation about software agents.

End of schedule.

If the user is operating both a graphical user interface and a telephone, as described in conjunction-with the Automated Office application, the result of this spoken request is to display a calendar window containing the current schedule. In this case, with no graphical display available, the GEN_NL agent 1202 is tasked to produce a spoken response that can be played over the phone. GEN_NL shares the same dynamic vocabulary and phrasal rules as the natural language parser DCG_NL 426, and contains strategies for producing responses to queries using either simple or list-based multimedia utterances.

1.3 FIND FRIDAY'S WEATHER IN BOSTON.

The weather in Boston for Friday is as follows:

Sunny in the morning. Partly cloudy in the afternoon with a 20 percent chance of thunderstorms late. Highs in the mid 70s.

In addition to data accessible from legacy applications, content may be retrieved by web-reading agents which provide wrappers around useful websites.

1.4 FIND ALL NEW MAIL MESSAGES.

There are 2 messages available.

Message 1, from Mark Tierny, entitled "OAA meeting."

1.5 NEXT MESSAGE

Message 2, from Jennifer Schwefler, entitled "Presentation Summary."

1.6 PLAY IT.

This message is a multipart MIME-encoded message. There are two parts.

Part 1. (Voicemail message, not text-to speech):

Thanks for taking part as a speaker in our conference.

The schedule will be posted soon on our homepage.

1.7 NEXTPART

Part 2. (read using text-to-speech):

The presentation home page is http://www . . .

1.8 PRINT MESSAGE

Command executed.

Mail messages are no longer just simple text documents, but often consist of multiple subparts containing audio files, pictures, webpages, attachments and so forth. When a user asks to play a complex email message over the telephone, many different agents may be implicated in the translation process, which would be quite different given the request "print it." The challenge is to develop a system which will enable agents to cooper ate in an extensible, flexible manner that alleviates explicit coding of agent interactions for every possible input/output combination.

In a preferred embodiment of the present invention, each agent concentrates only on what it can do and on what it knows, and leaves other work to be delegated to the agent community. For instance, a printer agent 1204, defining the solvable print(Object,Parameters), can be defined by the following pseudo-code, which basically says, "If someone can get me a document, in either POSTSCRIPT or text form, I can print it.".

```
print(Object, Parameters) {
    ' If Object is reference to "it", find an appropriate document
    if (Object = "ref(it)")
        oaa_Solve(resolve_reference(the, document, Params, Object),[ ]);
    ' Given a reference to some document, ask for the document in
    POSTSCRIPT if (Object = "id(Pointer)")
        oaa_Solve(resolve_id_as(id(Pointer), postscript, [ ], Object),[ ]);
    ' If Object is of type text or POSTSCRIPT, we can print it.
    if ((Object is of type Text) or (Object is of type Postscript))
        do_print(Object);
}
```

In the above example, since an email message is the salient document, the mail agent 442 will receive a request to produce the message as POSTSCRIPT. Whereas the mail agent 442 may know how to save a text message as POSTSCRIPT, it will not know what to do with a webpage or voicemail message. For these parts of the message, it will simply send oaa_Solve requests to see if another agent knows how to accomplish the task.

Until now, the user has been using only a telephone as user interface. Now, he moves to his desktop, starts a web browser 436, and accesses the URL referenced by the mail message.

1.9 RECORD MESSAGE

Recording voice message. Start speaking now.

1.10 THIS IS THE UPDATED WEB PAGE CONTAINING THE PRESENTATION SCHEDULE.

Message one recorded.

1.11 IF THIS WEB PAGE CHANGES, GET IT TO ME WITH NOTE ONE.

Trigger added as requested.

In this example, a local agent 436 which interfaces with the web browser can return the current page as a solution to the request "oaa_Solve(resolve_reference(this, web_page, [ ], Ref),[ ])", sent by the NL agent 426. A trigger is installed on a web agent 436 to monitor changes to the page, and when the page is updated, the notify agent 446 can find the user and transmit the webpage and voicemail message using the most appropriate media transfer mechanism.

This example based on the Unified Messaging application is intended to show how concepts in accordance with the present invention can be used to produce a simple yet extensible solution to a multi-agent problem that would be difficult to implement using a more rigid framework. The application supports adaptable presentation for queries across dynamically changing, complex information; shared context and reference resolution among applications; and flexible translation of multimedia data. In the next section, we will present an application which highlights the use of parallel competition and cooperation among agents during multi-modal fusion.

Multimodal Map

A further preferred embodiment of present invention incorporates the Multimodal Map application. This application demonstrates natural ways of communicating with a community of agents, providing an interactive interface on which the user may draw, write or speak. In a travel-planning domain illustrated by FIG. 13, available information includes hotel, restaurant, and tourist-site data retrieved by distributed software agents from commercial Internet sites. Some preferred types of user interactions and multi-modal issues handled by the application are illustrated by a brief scenario featuring working examples taken from the current system.

Sara is planning a business trip to San Francisco, but would like to schedule some activities for the weekend while she is there. She turns on her laptop PC, executes a map application, and selects San Francisco.

2.1 [Speaking] Where is downtown?

Map scrolls to appropriate area.

2.2 [Speaking and drawing region] Show me all hotels near here.

Icons representing hotels appear.

2.3 [Writes on a hotel] Info?

A textual description (price, attributes, etc.) appears.

2.4 [Speaking] I only want hotels with a pool.

Some hotels disappear.

2.5 [Draws a crossout on a hotel that is too close to a highway]

Hotel disappears 2.6 [Speaking and circling] Show me a photo of this hotel.

Photo appears.

2.7 [Points to another hotel]

Photo appears.

2.8 [Speaking] Price of the other hotel?

Price appears for previous hotel.

2.9 [Speaking and drawing an arrow] Scroll down.

Display adjusted.

2.10 [Speaking and drawing an arrow toward a hotel]

What is the distance from this hotel to Fisherman's Wharf?

Distance displayed.

2.11 [Pointing to another place and speaking] And the distance to here?

Distance displayed.

Sara decides she could use some human advice. She picks up the phone, calls Bob, her travel agent, and writes Start collaboration to synchronize his display with hers. At this point, both are presented with identical maps, and the input and actions of one will be remotely seen by the other.

3.1 [Sara speaks and circles two hotels]

Bob, I'm trying to choose between these two hotels. Any opinions?

3.2 [Bob draws an arrow, speaks, and points]

Well, this area is really nice to visit. You can walk there from this hotel.

Map scrolls to indicated area. Hotel selected.

3.3 [Sara speaks] Do you think I should visit Alcatraz?

3.4 [Bob speaks] Map, show video of Alcatraz.

Video appears.

3.5 [Bob speaks] Yes, Alcatraz is a lot of fun.

A further preferred embodiment of present invention generates the most appropriate interpretation for the incoming streams of multimodal input. Besides providing a user interface to a dynamic set of distributed agents, the application is preferably built using an agent framework. The present invention also contemplates aiding the coordinate competition and cooperation among information sources, which in turn works in parallel to resolve the ambiguities arising at every level of the interpretation process: low-level processing of the data stream, anaphora resolution, cross-modality influences and addressee.

Low-level processing of the data stream: Pen input may be preferably interpreted as a gesture (e.g., 2.5: cross-out) by one algorithm, or as handwriting by a separate recognition process (e.g., 2.3: "info?"). Multiple hypotheses may preferably be returned by a modality recognition component.

Anaphora resolution: When resolving anaphoric references, separate information sources may contribute to resolving the reference: context by object type, deictic, visual context, database queries, discourse analysis. An example of information provided through context by object type is found in interpreting an utterance such as "show photo of the hotel", where the natural language component can return a list of the last hotels talked about. Deictic information in combination with a spoken utterance like "show photo of this hotel" may preferably include pointing, circling, or arrow gestures which might indicate the desired object (e.g., 2.7). Deictic references may preferably occur before, during, or after an accompanying verbal command. Information provided in a visual context, given for the request "display photo of the hotel" may preferably include the user interface agent might determine that only one hotel is currently visible on the map, and therefore this might be the desired reference object. Database queries preferably involving information from a database agent combined with results from other resolution strategies. Examples are "show me a photo of the hotel in Menlo Park" and 2.2. Discourse analysis preferably provides a source of information for phrases such as "No, the other one" (or 2.8).

The above list of preferred anaphora resolution mechanisms is not exhaustive. Examples of other preferred resolution methods include but are not limited to spatial reasoning ("the hotel between Fisherman's Wharf and Lombard Street") and user preferences ("near my favorite restaurant").

Cross-modality influences: When multiple modalities are used together, one modality may preferably reinforce or remove or diminish ambiguity from the interpretation of another. For instance, the interpretation of an arrow gesture may vary when accompanied by different verbal commands (e.g., "scroll left" vs. "show info about this hotel"). In the latter example, the system must take into account how accurately and unambiguously an arrow selects a single hotel.

Addressee: With the addition of collaboration technology, humans and automated agents all share the same workspace. A pen doodle or a spoken utterance may be meant for either another human, the system (3.1), or both (3.2).

The implementation of the Multimodal Map application illustrates and exploits several preferred features of the present invention: reference resolution and task delegation by parallel parameters of oaa_Solve, basic multi-user collaboration handled through built-in data management services, additional functionality readily achieved by adding new agents to the community, domain-specific code cleanly separated from other agents.

A further preferred embodiment of present invention provides reference resolution and task delegation handled in a distributed fashion by the parallel parameters of oaa_Solve, with meta-agents encoding rules to help the facilitator make context- or user-specific decisions about priorities among knowledge sources.

A further preferred embodiment of present invention provides basic multi-user collaboration handled through at least one built-in data management service. The map user interface preferably publishes data solvables for elements such as icons, screen position, and viewers, and preferably defines these elements to have the attribute "shareable". For every update to this public data, the changes are preferably automatically replicated to all members of the collaborative session, with associated callbacks producing the visible effect of the data change (e.g., adding or removing an icon).

Functionality for recording and playback of a session is preferably implemented by adding agents as members of the collaborative community. These agents either record the data changes to disk, or read a log file and replicate the changes in the shared environment.

The domain-specific code for interpreting travel planning dialog is preferably separated from the speech, natural language, pen recognition, database and map user interface agents. These components were preferably reused without modification to add multimodal map capabilities to other applications for activities such as crisis management, multi-robot control, and the MVIEWS tools for the video analyst.

Improved Scalability and Fault Tolerance

Implementations of a preferred embodiment of present invention which rely upon simple, single facilitator architectures may face certain limitations with respect to scalability, because the single facilitator may become a communications bottleneck and may also represent a single, critical point for system failure.

Multiple facilitator systems as disclosed in the preferred embodiments to this point can be used to construct peer-to-peer agent networks as illustrated in FIG. 14. While such embodiments are scalable, they do possess the potential for communication bottlenecks as discussed in the previous paragraph and they further possess the potential for reliability problems as central, critical points of vulnerability to systems failure.

A further embodiment of present invention supports a facilitator implemented as an agent like any other, whereby multiple facilitator network topologies can be readily constructed. One example configuration (but not the only possibility) is a hierarchical topology as depicted in FIG. 15, where a top level Facilitator manages collections of both client agents 1508 and other Facilitators, 1504 and 1506. Facilitator agents could be installed for individual users, for a group of users, or as appropriate for the task.

Note further, that network work topologies of facilitators can be seen as graphs where each node corresponds to an instance of a facilitator and each edge connecting two or more nodes corresponds to a transmission path across one or more physical transport mechanisms. Some nodes may represent facilitators and some nodes may represent clients. Each node can be further annotated with attributes corresponding to include triggers, data, capabilities but not limited to these attributes.

A further embodiment of present invention provides enhanced scalability and robustness by separating the planning and execution components of the facilitator. In contrast with the centralized facilitation schemes described above, the facilitator system 1600 of FIG. 16 separates the registry/planning component from the execution component. As a result, no single facilitator agent must carry all communications nor does the failure of a single facilitator agent shut down the entire system.

Turning directly to FIG. 16, the facilitator system 1600 includes a registry/planner 1602 and a plurality of client agents 1612–1616. The registry/planner 1604 is typically replicated in one or more locations accessible by the client agents. Thus if the registry/planner 1604 becomes unavailable, the client agents can access the replicated registry/planner(s).

This system operates, for example, as follows. An agent transmits a goal 1610 to the registry planner 1602. The registry/planner 1604 translates the goal into an unambiguous execution plan detailing how to accomplish any sub-goals developed from the compound goal, as well as specifying the agents selected for performing the sub-goals. This execution plan is provided to the requesting agent which in turn initiates peer-to-peer interactions 1618 in order to implement the detailed execution plan, routing and combining information as specified within the execution plan. Communication is distributed thus decreasing sensitivity of the system to bandwidth limitations of a single facilitator agent. Execution state is likewise distributed thus enabling system operation even when a facilitator agent fails.

Further embodiments of present invention incorporate into the facilitator functionality such as load-balancing, resource management, and dynamic configuration of agent locations and numbers, using (for example) any of the topologies discussed. Other embodiments incorporate into a facilitator the ability to aid agents in establishing peer-to-peer communications. That is, for tasks requiring a sequence of exchanges between two agents, the facilitator assist the agents in finding one another and establishing communication, stepping out of the way while the agents communicate peer-to-peer over a direct, perhaps dedicated channel.

Further preferred embodiments of the present invention incorporate mechanisms for basic transaction management, such as periodically saving the state of agents (both facilitator and client) and rolling back to the latest saved state in the event of the failure of an agent.

Extensibility: Incorporating Distributed Object Services

Figure 2:
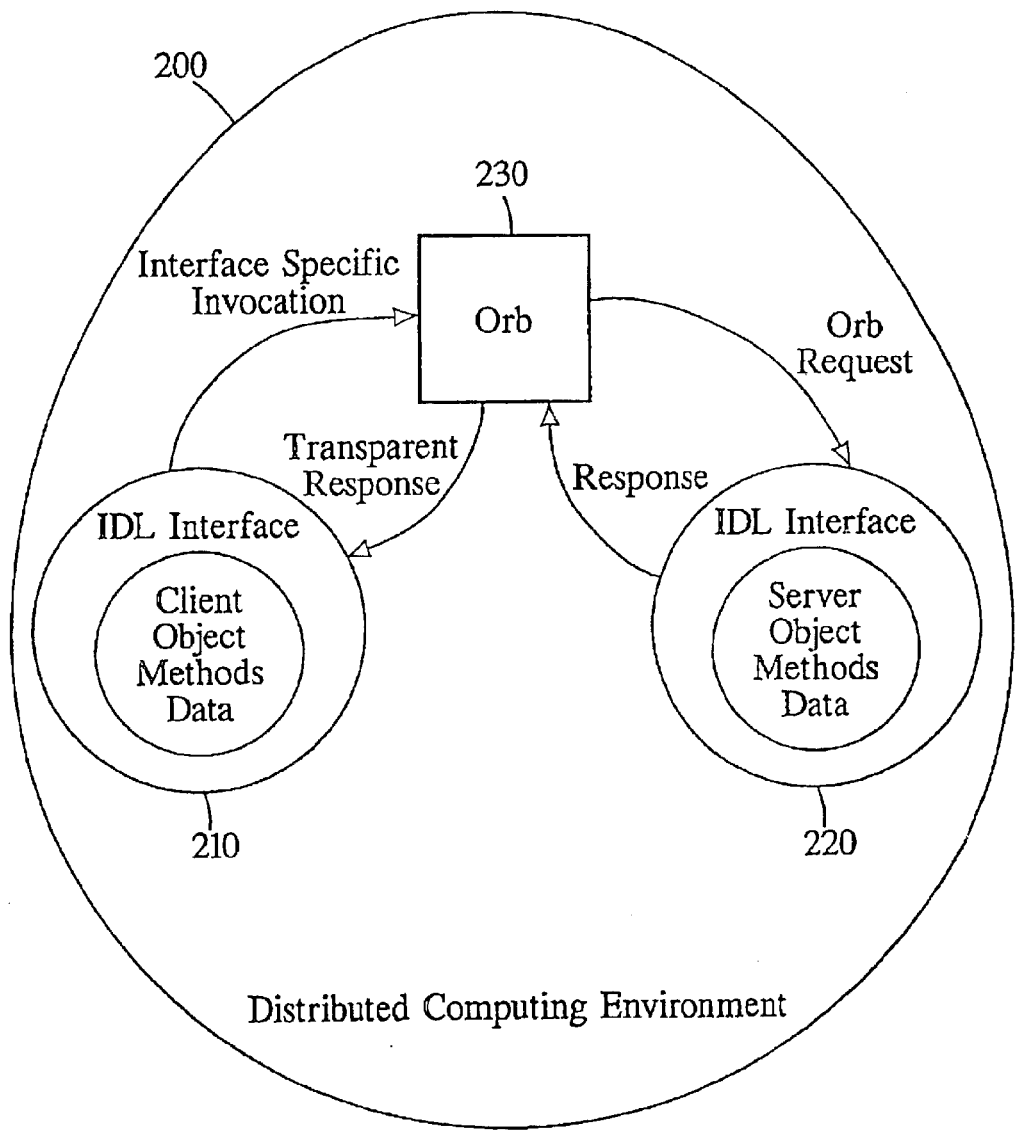
FIG. 2 depicts a distributed object technology based around an Object Resource Broker.

As known by those of skill in the art and as previously discussed in connection with FIG. 2, distributed object technologies such as CORBA, Jini, and DCOM typically provide some sort of component registry listing the interface descriptions of available objects, and a convenient and efficient mechanism (such as a pointer or a downloadable module) enabling user applications to transparently invoke a desired object's services regardless of where the object actually resides. Such distributed object technologies are becoming increasingly popular and widespread due to the great scalability and efficiency they provide in managing large bodies of objects distributed over many remote platforms. Unlike the present invention, however, as previously discussed in connection with FIG. 2, these distributed object technologies are generally designed such that user software applications must include code that explicitly invokes the desired object and specifies the particular service that is desired. Thus, these alternative distributed object technologies are relatively limited to fixed (pre-determined) interactions between objects, and fail to provide (among other things) dynamic ICL expandability, intelligent sub-goal sequencing and delegation, and intelligent collaboration among computational components as provided by preferred embodiments of the present invention.

Alternative embodiments of the present invention offer "the best of both worlds" and increases the problem solving capacity of the present invention by leveraging alternative software technologies for managing distributed objects, such as Jini, CORBA, or DCOM. This extensible approach greatly expands the capabilities of the present invention as well as those of a pre-existing distributed object system. Through access to distributed object systems, a distributed agent community in accordance with the present invention can draw upon the capabilities of all of the objects managed by the distributed object system, and will add a layer of collaboration and intelligent planning that the distributed object systems do not themselves provide. Moreover, such use of the present invention in conjunction with a distributed object system allows an object to generate a request for service that is routed to a facilitator and intelligently delegated and sequenced for performance by other objects and/or agents. The object can thereby even obtain the services of electronic agents outside of the distributed object service environment if the facilitator determines that such an agent could best accomplish the goal.

A distributed object system 1701, such as depicted in the left-hand portion of FIG. 17, allows communication among a plurality of distributed software based objects 1704. In such a system, one object can invoke another object through the use of specifically coded object calls 1705. The distributed object system contains a registry mechanism 1702 (e.g., the Object Request Broker or "ORB" in CORBA) which stores interface descriptions 1706 of its member objects 1704, and which allows object calls 1705 to transparently invoke a desired object's services regardless of where the object actually resides.

A facilitator-based agent community 1720 in accordance with the present invention is depicted on the right-hand portion of FIG. 17, including facilitator 1710 which includes agent registry 1712 and electronic agents 1714.

With continued reference to FIG. 17, in one embodiment of the invention, bridge agent 1708 serves to bridge or couple distributed object system 1701 and distributed agent community 1720. The interface descriptions 1706 listed within distributed object registry 1702 are read by a bridge agent 1708. The bridge agent has the capability of being able to communicate in a protocol understandable by the distributed object system 1701 as well as in the interagent communication language (ICL) of the distributed agent community 1720, and has the ability to translate between the two. The bridge agent, upon receiving the interface descriptions of the objects 1704, translates the information into the ICL and registers this translated information with agent registry 1712, preferably as its own capabilities.

With continued reference to FIG. 17, if the facilitator determines that a current goal can best be serviced by the capabilities registered through the bridge agent 1708, service providing object 1704(b) registered with distributed object registry mechanism 1702 would be best able to accomplish the necessary goal, the facilitator will delegate the goal to bridge agent 1708, which will in turn translate the goal from ICL into a call 1705 coded to invoke the corresponding distributed object 1704. By drawing upon the capabilities of the objects of distributed object system 1701, the resources available to the facilitator to achieve its goals are greatly increased. Of course the facilitator could also delegate the goal directly to an agent 1714 independent of the distributed object service if the facilitator determines the agent would be best able to accomplish the goal. Preferably, the bridge agent 1708 periodically updates the agent registry 1712. In this way, if new objects 1704 are added to the distributed object system 1701 or if certain object become unavailable, the facilitator 1710 will be able to calculate a goal satisfaction plan accordingly. Further in accordance with this alternative embodiment of the present invention, facilitator 1710 can receive a request for service originating from an object within distributed object system 1701. To provide this capability, bridge agent 1708 preferably registers an interface with registry mechanism 1702 in the protocol of distributed object system 1701. Object 1704(a) may then generate a call 1705 directed to the bridge agent 1708, and call 1705 may in this case specify (as a parameter) a request for service intended for intelligent delegation via distributed agent community 1720. Bridge agent 1708 would then translate the call 1705 and the request for service into the ICL and forward the ICL request to the facilitator 1710. Once the facilitator 1710 has received the request, it devises a plan to satisfy the request as described in the previously disclosed embodiments. Thus, this embodiment powerfully augments distributed object system 1701 by providing it with access to the capabilities of facilitator 1710 and agent community 1720.

The extensible system thus disclosed in accordance with FIG. 17 greatly expands the capabilities of present invention and as well as those of a pre-existing distributed object system. By accessing the distributed object system the present invention can draw upon the capabilities of all of the objects represented therein. On the other hand, such use of the present invention in conjunction with a distributed object service allows an object to generate a request without knowing what object will be needed by sending the request as a call to invoke the facilitator. The object can thereby even invoke the services of electronic agents outside of the distributed object service environment if the facilitator determines that such an agent could best accomplish the goal.

Additionally, bridge agent 1708 may be employed in similar fashion as a connection to other distributed agent communities which do not necessarily utilize the same ICL of distributed agent community 1720 (e.g., a KQML agent community). More generally, this bridge-based approach provides an interoperability solution between multiple (incompatible) communities of distributed agents and/or objects. In a further alternative embodiment, the functionality of bridge agent 1708 of FIG. 17 may be implemented as multiple agents or as an integral part of facilitator 1710, depending on efficiency and operational considerations as will be apparent to those of skill art.

What is claimed is:

1. A computer-implemented method for communication and cooperative task completion between a community of distributed electronic agents communicating using a dynamically expandable interagent communication language ("ICL") and at least one other distributed component system, the other distributed component system communicating using a protocol incompatible with the ICL, the method comprising the acts of:

a) receiving by a bridge agent a description of functional capabilities of components of the other distributed component system from a component registry of the other distributed component system, wherein the component registry physically independent from the bridge agent;

b) translating the functional capabilities of components received in step (a) from the protocol of the other distributed component system into the ICL, to create a translated description;

c) adding to a facilitator registry of the community of distributed agents the translated description, wherein the facilitator registry is distinct from the component registry;

d) responsive to a request for service to the community of distributed agents, delegating an ICL sub-goal request to the bridge agent;

e) translating at the bridge agent the delegated ICL sub-goal request into the incompatible protocol of the other distributed system, to create a translated request; and f) invoking one or more components of the other distributed component system using the translated request.

2. A computer implemented method as recited in claim 1, wherein the request for service is generated by one of the components of the other distributed component system, the method further comprising the acts of:

transmitting the request for service to the bridge agent; and translating the request for service into the ICL.

3. A computer implemented method as recited in claim 1, wherein the request for service is received from an agent capable of communicating in the ICL.

4. A computer implemented method as recited in claim 1, further comprising the acts of:

receiving functional capabilities of one or more of the distributed electronic agents;

adding the functional capabilities to the facilitator registry;

determining a second ICL sub-goal necessary to accomplish the request for service;

selecting from the facilitator registry an agent capable of completing the second ICL sub-goal; and delegating the second ICL sub-goal to the selected agent.

5. A computer implemented method as recited in claim 1, wherein the components of the other distributed component system are software based objects.

6. A computer implemented method as recited in claim 5, wherein the other distributed component system is a distributed object service.

7. A computer implemented method as recited in claim 6, wherein the other distributed component system utilizes Jini software.

8. A computer implemented method as recited in claim 6 wherein the other distributed component system utilizes Corba software.

9. A computer implemented method as recited in claim 6, wherein the other distributed component system utilizes Java software.

10. A computer readable medium containing a program providing instructions for coordinating communication and cooperative task completion between a community of distributed electronic agents communicating using a dynamically expandable interagent communication language ("ICL") and at least one other distributed component system communicating using a protocol incompatible with the ICL, said instructions performing the steps of:

a) receiving by a bridge agent a description of functional capabilities of components of the other distributed component system from a component registry, wherein the component registry is physically independent from the bridge agent;

b) translating the functional capabilities of components received in step (a) from the protocol of the other distributed computing system into the ICL, to create a translated description;

c) adding to a facilitator registry of the community of distributed agents the translated description, wherein the facilitator registry is distinct from the component registry; and d) responsive to a request for service to the community of distributed agents, delegating an ICL sub-goal request to the bridge agent, whereby the bridge agent will translate the ICL sub-goal request into the incompatible protocol of the other distributed component system to create a translated request used to invoke one or more components of the other distributed component system using the translated request.

11. A computer readable medium as recited in claim 10, wherein the request for service originates as an incompatible request for service generated in the protocol incompatible with the ICL by one of the components registered in the component registry, the method further comprising the steps of:

transmitting the incompatible request for service to the bridge agent; and translating the incompatible request for service into the ICL; and transmitting the translated incompatible request for service from the bridge agent to the facilitator.

12. A computer readable medium as recited in claim 10, wherein the request for service is received from the community of distributed electronic agents.

13. A computer readable medium as recited in claim 10 further comprising the steps of:

receiving functional capabilities of one or more of the distributed electronic agents;

adding the functional capabilities to the facilitator registry;

determining a second ICL sub-goal necessary to accomplish the request for service;

selecting from the facilitator registry an agent capable of completing the second ICL sub-goal; and delegating the second ICL sub-goal to the selected agent.

14. A computer readable medium as recited in claim 10, wherein the components of the other distributed component system are software based objects.

15. A computer readable medium as recited in claim 14, wherein the other distributed component system is a distributed object service.

16. A computer readable medium as recited in claim 15, wherein the other distributed component system utilizes Jini software.

17. A computer readable medium as recited in claim 15, wherein the other distributed component system utilizes Corba software.

18. A computer readable medium as recited in claim 15, wherein the other distributed component system utilizes Java software.

19. A software-based flexible computer architecture for communication and cooperative task completion between a community of distributed electronic agents communicating using a dynamically expandable interagent communication language ("ICL") and at least one other distributed component system, the other distributed component system communicating using a protocol incompatible with the ICL, the computer architecture comprising:

a plurality of electronic agents capable of communicating in the ICL, at least one of the agents being a bridge agent capable of translating between the ICL and the protocol understood by the other distributed component system, and further capable of translating a description of functional capabilities of components of the other distributed component system registered in a component registry, wherein the component registry is physically independent from the bridge agent; and a facilitator capable of receiving from the bridge agent, in the ICL format, the translated description of functional capabilities of the components of the other distributed component system and registering the translated description of the functional capabilities in a facilitator registry, the facilitator further capable of receiving a service request in the ICL and in response to the service request, determining a sub-goal request necessary to accomplish the service request, and delegating the sub-goal request, in the ICL, to the bridge agent based upon a match between the sub-goal request and the functional capabilities registered in the facilitator registry, wherein the bridge agent will translate the ICL request into the protocol of the other distributed component system to invoke at least one of the components of the other distributed component system and wherein the component registry is distinct from the facilitator registry.

20. A software based flexible computer architecture as recited in claim 19, wherein the components of the other distributed component system are software based objects and the other distributed component system is a distributed object service.

21. A software based flexible computer architecture as recited in claim 20 wherein the other distributed component system is based on Jini software.

22. A software based flexible computer architecture as recited in claim 20 wherein the other distributed component system is based on Corba software.

23. A software based flexible computer architecture as recited in claim 20 wherein the other distributed component system is based on Java software.

24. A software based flexible computer architecture as recited in claim 19 wherein the bridge agent is integral with the facilitator.

* * * * *